(12) United States Patent
Baker et al.

(10) Patent No.: US 9,176,844 B2
(45) Date of Patent: *Nov. 3, 2015

(54) SYSTEM AND METHOD TO CLASSIFY AUTOMATED CODE INSPECTION SERVICES DEFECT OUTPUT FOR DEFECT ANALYSIS

(71) Applicant: INTERNATIONAL BUSINESS MACHINES CORPORATION, Armonk, NY (US)

(72) Inventors: Ian E. Baker, South Elgin, IL (US); Kathryn A. Bassin, Harpursville, NY (US); Steven Kagan, Burr Ridge, IL (US); Susan E. Smith, Talking Rock, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/510,296

(22) Filed: Oct. 9, 2014

(65) Prior Publication Data

US 2015/0067649 A1      Mar. 5, 2015

Related U.S. Application Data

(63) Continuation of application No. 13/923,581, filed on Jun. 21, 2013, now Pat. No. 8,924,936, which is a continuation of application No. 12/558,274, filed on Sep. 11, 2009, now Pat. No. 8,527,955.

(51) Int. Cl.
*G06F 9/44* (2006.01)
*G06F 11/36* (2006.01)
*G06F 9/445* (2006.01)

(52) U.S. Cl.
CPC ........ *G06F 11/3604* (2013.01); *G06F 9/44589* (2013.01)

(58) Field of Classification Search
None
See application file for complete search history.

(56) References Cited

U.S. PATENT DOCUMENTS

| | | | |
|---|---|---|---|
| 5,539,652 A | | 7/1996 | Tegethoff |
| 5,651,111 A | | 7/1997 | McKeeman et al. |
| 5,724,273 A | * | 3/1998 | Desgrousilliers et al. ..... 702/120 |
| 5,854,924 A | | 12/1998 | Rickel et al. |
| 5,905,856 A | | 5/1999 | Ottensooser |
| 6,154,876 A | * | 11/2000 | Haley et al. ................... 717/133 |

(Continued)

OTHER PUBLICATIONS

Ulrich, "Test Case Dependency Processing in Robot Framework", https://groups.google.com/forum/?fromgroups#!topic/robotframework-users/twcycBNLX14, Google, Feb. 16, 2009, pp. 1-4.

Chan et al., "A Tool to Support Perspective Based Approach to Software Code Inspection", Proceedings of the 2005 Australian Software Engineering Conference, IEEE, 2005, 8 pages.

(Continued)

*Primary Examiner* — Chameli Das
(74) *Attorney, Agent, or Firm* — Matthew Chung; Roberts Mlotkowski Safran & Cole, P.C.

(57) ABSTRACT

A method is implemented in a computer infrastructure having computer executable code tangibly embodied on a computer readable storage medium having programming instructions. The programming instructions are operable to receive a tool error output determined by a code inspection tool and select at least one defect classification mapping profile based on the code inspection tool. Additionally, the programming instructions are operable to map the tool error output to one or more output classifications using the selected at least one defect classification mapping profile and generate at least one report based on the one or more output classifications.

18 Claims, 51 Drawing Sheets

(56) References Cited

U.S. PATENT DOCUMENTS

| | | | |
|---|---|---|---|
| 6,186,677 | B1* | 2/2001 | Angel et al. ............... 717/118 |
| 6,332,211 | B1 | 12/2001 | Pavela |
| 6,442,748 | B1 | 8/2002 | Bowman-Amuah |
| 6,456,506 | B1 | 9/2002 | Lin |
| 6,477,471 | B1 | 11/2002 | Hedstrom et al. |
| 6,519,763 | B1 | 2/2003 | Kaufer et al. |
| 6,546,506 | B1 | 4/2003 | Lewis |
| 6,601,017 | B1 | 7/2003 | Kennedy et al. |
| 6,601,233 | B1* | 7/2003 | Underwood ............... 717/102 |
| 6,725,399 | B1 | 4/2004 | Bowman |
| 6,766,473 | B2 | 7/2004 | Nozuyama |
| 6,862,696 | B1* | 3/2005 | Voas et al. ............... 714/38.11 |
| 6,889,167 | B2 | 5/2005 | Curry |
| 6,901,535 | B2 | 5/2005 | Yamauchi et al. |
| 6,988,055 | B1 | 1/2006 | Rhea et al. |
| 7,080,351 | B1 | 7/2006 | Kirkpatrick et al. |
| 7,200,775 | B1 | 4/2007 | Rhea et al. |
| 7,219,287 | B1 | 5/2007 | Toutounchi et al. |
| 7,231,549 | B1 | 6/2007 | Rhea et al. |
| 7,334,166 | B1 | 2/2008 | Rhea et al. |
| 7,451,009 | B2 | 11/2008 | Grubb et al. |
| 7,630,914 | B2 | 12/2009 | Veeningen et al. |
| 7,788,647 | B2 | 8/2010 | Martin et al. |
| 7,809,520 | B2 | 10/2010 | Adachi |
| 7,861,226 | B1 | 12/2010 | Episkopos et al. |
| 7,886,272 | B1 | 2/2011 | Episkopos et al. |
| 7,917,897 | B2 | 3/2011 | Bassin et al. |
| 7,984,304 | B1 | 7/2011 | Waldspurger et al. |
| 8,001,530 | B2 | 8/2011 | Shitrit |
| 8,191,044 | B1 | 5/2012 | Berlik et al. |
| 8,539,438 | B2 | 9/2013 | Bassin et al. |
| 8,578,341 | B2 | 11/2013 | Bassin et al. |
| 2001/0052108 | A1* | 12/2001 | Bowman-Amuah ........... 717/1 |
| 2002/0078401 | A1 | 6/2002 | Fry |
| 2002/0188414 | A1 | 12/2002 | Nulman |
| 2003/0018952 | A1 | 1/2003 | Roetzheim |
| 2003/0033191 | A1 | 2/2003 | Davies et al. |
| 2003/0058277 | A1 | 3/2003 | Bowman-Amuah |
| 2003/0070157 | A1 | 4/2003 | Adams et al. |
| 2003/0196190 | A1 | 10/2003 | Ruffolo et al. |
| 2004/0205727 | A1 | 10/2004 | Sit et al. |
| 2004/0225465 | A1 | 11/2004 | Pramanick et al. |
| 2004/0267814 | A1 | 12/2004 | Ludwig et al. |
| 2005/0021766 | A1* | 1/2005 | McKeowen et al. ......... 709/228 |
| 2005/0071807 | A1 | 3/2005 | Yanavi |
| 2005/0102654 | A1 | 5/2005 | Henderson et al. |
| 2005/0114828 | A1 | 5/2005 | Dietrich et al. |
| 2005/0144529 | A1 | 6/2005 | Gatz et al. |
| 2005/0209866 | A1 | 9/2005 | Veeningen et al. |
| 2005/0283751 | A1 | 12/2005 | Bassin et al. |
| 2006/0047617 | A1 | 3/2006 | Bacioiu et al. |
| 2006/0123389 | A1* | 6/2006 | Kolawa et al. ............... 717/101 |
| 2006/0248504 | A1 | 11/2006 | Hughes |
| 2006/0251073 | A1 | 11/2006 | Lepel et al. |
| 2006/0265188 | A1 | 11/2006 | French et al. |
| 2007/0028220 | A1* | 2/2007 | Miller et al. ............... 717/124 |
| 2007/0100712 | A1 | 5/2007 | Kilpatrick et al. |
| 2007/0101215 | A1 | 5/2007 | Holmqvist |
| 2007/0112879 | A1 | 5/2007 | Sengupta |
| 2007/0168744 | A1 | 7/2007 | Pal et al. |
| 2007/0174023 | A1 | 7/2007 | Bassin et al. |
| 2007/0234294 | A1 | 10/2007 | Gooding |
| 2007/0283325 | A1 | 12/2007 | Kumar et al. |
| 2007/0283417 | A1 | 12/2007 | Smolen et al. |
| 2007/0300204 | A1 | 12/2007 | Andreev et al. |
| 2008/0010543 | A1 | 1/2008 | Yamamoto et al. |
| 2008/0016415 | A1 | 1/2008 | Ide |
| 2008/0022167 | A1 | 1/2008 | Chung et al. |
| 2008/0052707 | A1 | 2/2008 | Wassel et al. |
| 2008/0072328 | A1 | 3/2008 | Walia et al. |
| 2008/0092108 | A1 | 4/2008 | Corral |
| 2008/0092120 | A1 | 4/2008 | Udupa et al. |
| 2008/0104096 | A1 | 5/2008 | Doval et al. |
| 2008/0162995 | A1 | 7/2008 | Browne et al. |
| 2008/0178145 | A1 | 7/2008 | Lindley |
| 2008/0201611 | A1 | 8/2008 | Bassin et al. |
| 2008/0201612 | A1* | 8/2008 | Bassin et al. ............... 714/38 |
| 2008/0255693 | A1 | 10/2008 | Chaar et al. |
| 2009/0070734 | A1 | 3/2009 | Dixon et al. |
| 2009/0089755 | A1* | 4/2009 | Johnson et al. ............... 717/124 |
| 2010/0005444 | A1 | 1/2010 | McPeak |
| 2010/0145929 | A1 | 6/2010 | Burger et al. |
| 2010/0211957 | A1 | 8/2010 | Lotlikar et al. |
| 2010/0275263 | A1 | 10/2010 | Bennett et al. |
| 2010/0332274 | A1 | 12/2010 | Cox et al. |
| 2011/0296371 | A1 | 12/2011 | Marella |
| 2012/0017195 | A1 | 1/2012 | Kaulgud et al. |
| 2012/0053986 | A1 | 3/2012 | Cardno et al. |
| 2012/0144374 | A1* | 6/2012 | Gallagher et al. ............ 717/128 |

OTHER PUBLICATIONS

Unknown, "ASTQB—ISTQB Software Testing Certification : ISTQB Syllabi", http:/fweb.archive.orb/web/20090423053623/http:/fwww.astqb.org/educational-resources/syllabi-management5.php, retrieved Jun. 7, 2012, pp. 1-12.

Kwinkelenberg, R. et al., "Smartesting for Dummies", Oct. 14, 2008, Wiley, 36 pages.

Lazic, L. et al., "Cost Effective Software Test Metrics", WSEAS Transactions on Computers, Issue 6, vol. 7, Jun. 2008, pp. 559-619.

Hou, R. et al., Optimal Release Times for Software Systems with Scheduled Delivery Time Based on the HGDM, IEEE Transactions on Computers, vol. 46, No. 2, Feb. 1997, pp. 216-221.

Ambler, S., "Choosing the Right Software Method for the Job", http://fweb.archive.org/web/20090219074845 1http:/fagiledata.org/essays/differentStrategies.html, retrieved Jun. 7, 2012, pp. 1-14.

Boehm, B., "Software Engineering Economics", IEEE Transactions on Software Engineering, vol. SE-19, No. 1, Jan. 1984, pp. 4-21.

Basili, V. et al., "Comparing the Effectiveness of Software Testing Strategies", IEEE Transactions on Software Engineering, vol. SE-13, No. 12, Dec. 1987, pp. 1278-1296.

Tonella, P., "Publication List", 2012, retrieved from http://selab.fbk.eu/tonella/papersbyyear.html, 15 pages.

Holden, I. et al., "Imporoving Testing Efficiency using Cumulative Test Analysis", Proceedings of the Testing: Academic & Idustrial conference—Practice and Research Techniques, IEEE, 2006, pp. 1-5.

Holden, I., "Improving Testing Efficiency using Cumulative Test Analysis", 2006, 25 slices, retrieved from http://www2006.ta icpart.org/presentations/session5/3 .pdf, pp. 1-25.

Ponaraseri, S. et al., "Using the Planning Game for Test Case Prioritization", retrieved from http:selab.fbk.eu/tonella/papers/issre2008 .pdf, pp. 1-10.

McGarry, J. et al., "Practical Software Measurement: A Guide to Objective Program Insight", http://pdf.aminer.org/000/3611576/practical_software_measurement.pdf, Naval Undersea Warfare Center, Version 2.1, Part 1 to Part 4, 1996, 299 pages.

Jonsson, G., "A Case Study into the Effects of Software Process Improvement on Product Quality", Jun. 2004, Master's Tesis in Computer Science—University of Iceland, 93 pages.

Hurlbut, "Managing Domain Architecture Evolution Through Adaptive Use Case and Business Rule Models", 1997, pp. 1-42.

Chan, Lipo "A tool to support perspective based approach to software code inspection", dated 2005, IEEE.

LSU (Estimating Project Costs & Time, Louisiana State University, dated Jul. 25, 2004; retrieved online Oct. 18, 2012; URL: http://laspace. lsu.edu/aces/Lectu res/Managemeni/Lecture%205%20-%20Estimating%20Costs.

Notice of Allowance dated Aug. 20, 2014 in related U.S. Appl. No. 13/923,581, 11 pp.

Office Action dated Oct. 10, 2014 in related U.S. Appl. No. 12/558,324, 13 pp.

Notice of Allowance dated Jan. 30, 2015 in related U.S. Appl. No. 14/041,440, 7 pp.

Final Office Action dated Nov. 20, 2014 in related U.S. Appl. No. 14/041,440, 7 pp.

Final Office Action dated May 12, 2015 for related U.S. Appl. No. 12/558,324, 6 pages.

Office Action dated Jun. 12, 2015 for related U.S. Appl. No. 13/930,870, 16 pages.

* cited by examiner

| 1.1a Images and animations Tool Error Output | Tool Error Output Classification | | | |
|---|---|---|---|---|
| | Target/Trigger/Impact | Type | Qualifier | Severity |
| SV Provide alternative text for all image-type buttons. [ImageTypeButton2] | | Algorithm | Missing | 1 |
| SV Alternative text should be brief. [AltAttributeLength2] | Requirements/Design/Code | Algorithm | Extraneous | 1 |
| SV The ALT attribute must be defined for image "FILENAME". [ImgMissingAlt2] | | Assignment | Missing | 1 |
| SV Image "FILENAME" must have a meaningful description in the ALT attribute or in the surrounding link body. [ImgLinkAlt2] | Variation | Algorithm | Missing | 1 |
| SV Image "FILENAME" should have a meaningful description, or "" for images that do not convey meaningful information, in the ALT attribute. [ImgAlt2] | Accessibility | Assignment | Missing | 1 |
| SV Provide alternative text for each APPLET. [AppletAlt2] | | Algorithm | Missing | 1 |
| SV Provide a text equivalent in the content for the APPLET element. [AppletText] | | Algorithm | Missing | 1 |
| SV The longdesc attribute value must be a valid URI. [LongdescURI] | | Assignment | Incorrect | 1 |
| SV Use no title or title="" when using alt="" to indicate images that Assistive Technologies should ignore. [NullAltAndTitle] | | Assignment | Incorrect | 1 |
| PSV Equivalent alternative may be needed for the multimedia object. [Multimedia4] | | Assignment | Missing | 2 |
| PSV Equivalent alternative may be needed for the multimedia reference. [Multimedia5] | | Assignment | Missing | 2 |
| PSV Equivalent alternative may be needed for the Shockwave presentation. [Multimedia6] | | Assignment | Missing | 2 |

FIG. 3

1.1b Non-text content

400

| Tool Error Output | Tool Error Output Classification | | | |
|---|---|---|---|---|
| | Target/Trigger/Impact | Type | Qualifier | Severity |
| SV Provide a text equivalent in the content for the APPLET element. [AppletText] | Requirements/Design/Code | Assignment | Missing | 1 |
| V AREA element must have an acceptable description in the ALT attribute. [ClientSideImageMapArea2] | | Assignment | Missing | 3 |
| PSV Use NOEMBED to give an alternative to EMBED in case the user agent does not support EMBED tags. [Noembed] | Variation | Assignment | Missing | 2 |
| PSV Provide a descriptive alternative text for the embedded component. [EmbedAltText] | Accessibility | Algorithm | Missing | 2 |
| PSV If OBJECT is used, provide a text equivalent in the content. [ObjectText2] | | Assignment | Missing | 2 |

1.1c Image maps

500

| Tool Error Output | Tool Error Output Classification | | | |
|---|---|---|---|---|
| | Target/Trigger/Impact | Type | Qualifier | Severity |
| SV Image for an image map must have description in ALT attribute. [ClientSideImageMapAlt2] | Requirements/Design/Code | Assignment | Missing | 1 |
| V AREA element must have an acceptable description in the ALT attribute. [ClientSideImageMapArea2] | | Assignment | Missing | 3 |
| PSV Provide client-side maps instead of server-side image maps if possible. [ServerSideMap2] | Variation Accessibility | Algorithm | Incorrect | 2 |

1.2a Captions

| Tool Error Output | Tool Error Output Classification | | | |
|---|---|---|---|---|
| | Target/Trigger/Impact | Type | Qualifier | Severity |
| PSV Equivalent alternative may be needed for the multimedia object. [Multimedia4] | Requirements/Design/Code | Checking | Missing | 2 |
| PSV Equivalent alternative may be needed for the multimedia reference. [Multimedia5] | Variation | | | |
| PSV Equivalent alternative may be needed for the Shockwave presentation. [Multimedia6] | Accessibility | | | |

FIG. 6

1.2b Audio descriptions and Multimedia alternatives

| Tool Error Output | Tool Error Output Classification | | | |
|---|---|---|---|---|
| | Target/Trigger/Impact | Type | Qualifier | Severity |
| PSV Equivalent alternative may be needed for the multimedia object. [Multimedia4] | Requirements/Design/Code | Checking | Missing | 2 |
| PSV Equivalent alternative may be needed for the multimedia reference. [Multimedia5] | Variation | | | |
| PSV Equivalent alternative may be needed for the Shockwave presentation. [Multimedia6] | Accessibility | | | |

FIG. 7

1.3a All Structures

| Tool Error Output | Tool Error Output Classification | | |
|---|---|---|---|
| | Target/Trigger/Impact | Type | Qualifier | Severity |
| V DD and DT tags must be in the context of a DL tag [DDandDTContext] | Requirements/Design/Code | Assignment | Missing | 3 |
| V DL tag does not have DT and DD tags nested. [DLBody] | Variation | Algorithm | Missing | 3 |
| PSV List container should contain list items. Use CSS to achieve presentational effects. [ListElements] | Accessibility | Algorithm | Incorrect | 2 |

FIG. 8

1.3d Forms

| Tool Error Output | Tool Error Output Classification | | |
|---|---|---|---|
| | Target/Trigger/Impact | Type | Qualifier | Severity |
| V Do not use the LABEL element implicitly. [Form4] | Requirements/Design/Code | Assignment | Missing | 3 |
| V Form controls and their labels should be explicitly associated with the LABEL element. [Form4] | Variation | Algorithm | Missing | 3 |
| | Accessibility | | | |

FIG. 9

| 2.1a Keyboard functionality | Tool Error Output Classification | | | |
| --- | --- | --- | --- | --- |
| Tool Error Output | Target/Trigger/Impact | Type | Qualifier | Severity |
| SV onDblClick is not accessible - use onClick instead. [OnDblClick2] | Requirements/Design/Code | Algorithm | Incorrect | 1 |
| SV The OnMouseMove event handler is not accessible. Use abstract, not device-specific, event handlers. [OnMouseMove] | | Algorithm | Missing | 1 |
| PSV Mouse events must be paired with key events to be accessible. [KeyMousePair2] | Variation | Algorithm | Incorrect | 2 |
| PV Do not use auto submit combo boxes. [OnChange2] | Accessibility | Algorithm | Incorrect | 3 |

| 2.1b Scripts | Tool Error Output Classification | | | |
| --- | --- | --- | --- | --- |
| Tool Error Output | Target/Trigger/Impact | Type | Qualifier | Severity |
| PSV Mouse events must be paired with key events to be accessible. [KeyMousePair2] | Requirements/Design/Code | Algorithm | Missing | 2 |
| PV Do not use auto submit combo boxes. [OnChange2] | Variation | Algorithm | Incorrect | 3 |
| | Accessibility | | | |

2.1c Applets, plug-ins, and non-HTML content

| Tool Error Output | Tool Error Output Classification | | | |
|---|---|---|---|---|
| | Target/Trigger/Impact | Type | Qualifier | Severity |
| SV onDblClick is not accessible - use onClick instead. [OnDblClick2] | Requirements/Design/Code | Algorithm | Incorrect | 1 |
| SV The OnMouseMove event handler is not accessible. Use abstract, not device-specific, event handlers. [OnMouseMove] | Variation | | | 1 |
| PSV Ensure that users are not trapped in content. [PlugIn4] | Accessibility | | | 2 |
| PSV Ensure that users are not trapped in content. [PlugIn5] | | | | 2 |
| PSV Ensure that users are not trapped in content. [PlugIn6] | | | | 2 |

2.2a Timed responses

| Tool Error Output | Tool Error Output Classification | | | |
|---|---|---|---|---|
| | Target/Trigger/Impact | Type | Qualifier | Severity |
| SV Do not create a timed redirect or automatic refresh. [TimedResponse3] | Requirements/Design/Code | Algorithm | Incorrect | 1 |
| | Variation | | | |
| | Accessibility | | | |

| 2.3a Threshold violations | | | |
|---|---|---|---|
| Tool Error Output | Tool Error Output Classification | | |
| | Target/Trigger/Impact | Type | Qualifier | Severity |
| V Do not create scrolling text with the marquee element. [Marquee2] | Requirements/Design/Code<br><br>Variation<br><br>Accessibility | Algorithm | Incorrect | 3 |

| 2.3a Threshold violations | | | |
|---|---|---|---|
| Tool Error Output | Tool Error Output Classification | | |
| | Target/Trigger/Impact | Type | Qualifier | Severity |
| SV The source of the FRAME or IFRAME should never be an image. [FrameSource2] | | Algorithm | Incorrect | 1 |
| V Provide a TITLE attribute for each FRAME element. [FrameAttribute5] | Requirements/Design/Code<br><br>Variation<br><br>Accessibility | Assignment | Missing | 3 |
| V The FRAME should have a meaningful description in the TITLE attribute. [FrameAttribute6] | | Assignment | Incorrect | 3 |
| V Provide a TITLE attribute for each IFRAME element. [IFrameTitle4] | | Assignment | Missing | 3 |
| V The IFRAME should have a meaningful description in the TITLE attribute. [IFrameTitle3] | | Assignment | Incorrect | 3 |

3.1a Readable content

| Tool Error Output | Tool Error Output Classification | | | |
|---|---|---|---|---|
| | Target/Trigger/Impact | Type | Qualifier | Severity |
| V The value of the LANG attribute must be set to one of the ISO 639 language codes. [LanguageISO639_2] | Requirements/Design/Code | Assignment | Incorrect | 3 |
| SV Use dir="rtl" for scripts that are written from right to left [RightToLeft] | Variation Accessibility | Assignment | Incorrect | 1 |

4.1a Unambiguous parsing of delivery units

| Tool Error Output | Tool Error Output Classification | | | |
|---|---|---|---|---|
| | Target/Trigger/Impact | Type | Qualifier | Severity |
| SV The id "TEXT" must be unique in a document. [DuplicateIDReporter2] | Requirements/Design/Code | Assignment | Incorrect | 1 |
| V Include a document type declaration at the beginning of a document that refers to a published DTD. [Doctype4] | Variation Accessibility | Algorithm | Missing | 3 |

4.1b Programmatic determination of user interface components

| Tool Error Output | Tool Error Output Classification | | | |
|---|---|---|---|---|
| | Target/Trigger/Impact | Type | Qualifier | Severity |
| V Do not use the LABEL element implicitly. [Form4] | Requirements/Design/Code | Assignment | Incorrect | 3 |
| V Form controls and their labels should be explicitly associated with the LABEL element. [Form4] | Variation Accessibility | Assignment | Missing | 3 |

| Memory Management: Memory Error Detection Tool Error Output | Tool Error Output Classification ||||| 
| | Target/Impact | Trigger | Type | Qualifier | Severity |
| --- | --- | --- | --- | --- | --- |
| SV Memory Leak (MLK) | Requirements/ Design/Code | Workload/Stress | Algorithm | Incorrect | 1 |
| SV Array Bounds Read (ABR) | Reliability | Workload/Stress | Checking | Missing | 1 |
| SV Array Bounds Write (ABW) | | Interaction | Checking | Missing | 1 |
| SV Free Memory Read (FMR) | | Interaction | Checking | Missing | 1 |
| SV Free Memory Write (FMW) | | Interaction | Checking | Missing | 1 |
| SV Freeing Freed Memory (FFM) | | Interaction | Assignment | Missing | 1 |
| SV Uninitialized Memory Read (UMR) | | Coverage | | | |

FIG. 19

| Error Text | Severity | Trigger | Target | Type | Qualifier | Impact | Category |
|---|---|---|---|---|---|---|---|
| 'Application Error' | 3 | Variation | | Checking | | | |
| 'Application Test Script Detected' | 3 | Coverage | | Checking | | | |
| 'Blind SQL Injection' | 1 | Variation | | Checking | | | |
| 'Cookie Poisoning SQL Injection' | 3 | Variation | | Checking | | | |
| 'Cross-Site Scripting' | 1 | Variation | | Checking | | | |
| 'Database Error Pattern Found' | 2 | Variation | | Checking | | | |
| 'Directory Listing' | 2 | Sequencing | | Algorithm | | | |
| 'Hidden Directory Detected' | 3 | Sequencing | | Checking | | | |
| 'HTML Comments Sensitive Information Disclosure' | 3 | Sequencing | | Checking | | | |
| 'HTTP Response Splitting ' | 3 | Variation | | Checking | | | |
| 'Inadequate Account Lockout' | 3 | Variation | | Interface | | | |
| 'Login Page SQL Injection ' | 3 | Variation | | Checking | | | |
| 'Microsoft ASP.NET Debugging Enabled' | 3 | Variation | | Checking | | | |
| 'Parameter DOM Based Cross-Site Scripting' | 3 | Variation | | Checking | | | |
| 'Permanent Cookie Contains Sensitive Session Information' | 3 | Variation | Requirements /Design/Code | Checking | Missing | Security | Security |
| 'Poison Null Byte Files Retrieval' | 3 | Variation | | Checking | | | |
| 'Possible Server Path Disclosure Pattern Found' | 3 | Sequencing | | Checking | | | |
| 'Predictable Login Credentials' | 1 | Variation | | Interface | | | |
| 'Sensitive Files Found' | 3 | Variation | | Checking | | | |
| 'Session Not Invalidated After Logout' | 3 | Variation | | Checking | | | |
| 'SQL Injection ' | 1 | Variation | | Checking | | | |
| 'Unencrypted___VIEWSTATE Parameter' | 3 | Variation | | Checking | | | |
| 'Unencrypted Login Request' | 2 | Variation | | Checking | | | |
| 'Unencrypted Password Parameter' | 3 | Variation | | Checking | | | |
| 'Unsigned___VIEWSTATE Parameter' | 3 | Variation | | Checking | | | |
| 'XPath Injection' | 3 | Variation | | Checking | | | |

FIG. 21

| Error Text | Severity | Trigger | Target | Artifact Type | Qualifier | Impact | Category |
|---|---|---|---|---|---|---|---|
| List of database views that have more than X characters. The length is a parameter that can be changed at will. | 3 | Design Conformance | Requirements | Algorithm | Incorrect | Standard | Technical Quality |
| "Nullable" Columns should be last in the Table Column order. | 3 | Design Conformance | /Design/Code | Algorithm | | Standard | Technical Quality |
| A Superclass is not allowed to have knowledge of one of her Subclasses. The Superclass has knowledge of the Subclass if the Superclass directly calls a Subclass-method, uses a Subclass-attribute or refers to the name of the Subclass. | 3 | Design Conformance | | Algorithm | | Standard | Technical Quality |
| Access to IMS segment must respect the access mode defined in PCB with the PROCOPT clause. | 1 | Coverage | | Algorithm | | Capability | Security |
| Afferent Coupling (also known as Incoming Dependencies and Number of Types outside a namespace that Depend on Types of the namespace) indicates The number of other namespaces that depend upon classes within the analyzed namespace. Afferent Coupling is a time consuming determination of couplings between namespaces, hence showing which namespaces that depend upon each other. The number of namespaces that depend upon the analyzed namespace is an indication of the analyzed namespace's level of responsibility. In order to improve modularity and promote encapsulation, inter-object class couples should be kept to a minimum. If the namespace is relatively abstract then a large number of incoming dependencies is acceptable but the larger the number of couples, the higher the sensitivity to changes in other parts of the design, and therefore maintenance is difficult. Excessive coupling between concrete object classes is detrimental to modular design and prevents reuse. | 3 | Design Conformance | | Algorithm | | Standard | Security |

2200

| Error Text | Severity | Trigger | Target | Artifact Type | Qualifier | Impact | Category |
|---|---|---|---|---|---|---|---|
| All Classes should be referenced. An unreferenced Artifact is an Artifact that is not explicitly called from within the analyzed code. | 3 | Design Conformance | Requirements | Algorithm | Incorrect | Standard | Technical Quality |
| All code should be executable. | 3 | Design Conformance | /Design/Code | Algorithm | | Standard | Technical Quality |
| All Data Members should be referenced (this exclude getter and setter). An unreferenced Artifact is an Artifact that is not explicitly called from within the analyzed code. | 3 | Design Conformance | | Algorithm | | Standard | Technical Quality |
| All functions should start with a specific prefix (i.e. fn_) | 3 | Design Conformance | | Algorithm | | Standard | Technical Quality |
| All Interfaces should be referenced. An unreferenced Artifact is an Artifact that is not explicitly called from within the analyzed code. | 3 | Design Conformance | | Algorithm | | Standard | Technical Quality |
| All Methods should be referenced. An unreferenced Artifact is an Artifact that is not explicitly called from within the analyzed code. | 3 | Design Conformance | | Algorithm | | Standard | Technical Quality |
| All methods that use "is" operator inside a loop will be reported. | 3 | Design Conformance | | Timing/Serialization | | Standard | Technical Quality |
| All String Classes should not call more than X times the + Method | 3 | Design Conformance | | Function | | Standard | Technical Quality |
| All String objects that use concatenation in loops (for, while, do while) will be reported. | 3 | Design Conformance | | Timing/Serialization | | Standard | Technical Quality |
| Applications should not access directly database Tables | 3 | Variation | | Algorithm | | Standard | Security |
| Artifacts should not have more than X lines of code. | | | | | | | |
| The threshold is a parameter and can be changed at will. | 3 | Design Conformance | | Algorithm | | Standard | Technical Quality |
| Avoid Artifacts with High Cyclomatic Complexity (CC greater than X) Cyclomatic Complexity is a measure of the complexity of the control structure of an Artifact. It is the number of linearly independent paths and therefore, the minimum number of independent paths when executing the software. The threshold is a parameter and can be changed at will. | 3 | Design Conformance | | Algorithm | | Standard | Technical Quality |

FIG. 23

| Error Text | Severity | Trigger | Target | Artifact Type | Qualifier | Impact | Category |
|---|---|---|---|---|---|---|---|
| Avoid Artifacts with High Essential Complexity (EC greater than X ). Essential Complexity measures the number of non-structured independent paths. Non-structured paths are paths of the control flow graph in which an instruction that interrupt the flow is present. The threshold is a parameter and can be changed at will. | 3 | Design Conformance | Requirements | Function | Incorrect | Standard | Technical Quality |
| Avoid Artifacts with High Essential Complexity (EC greater than X), Essential Complexity measures the number of non-structured independent paths. Non-structured paths are paths of the control flow graph in which an instruction that interrupt the flow is present. The threshold is a parameter and can be changed at will. | 3 | Design Conformance | /Design/Code | Algorithm | | Standard | Technical Quality |
| Avoid Artifacts with High Fan-In (Fan-In > X) The Fan-In of an Artifact is the number of other Artifacts that are referencing it. When computing the Fan-In of an Artifact, multiple accesses to it from the same Artifact are counted as one access. The threshold level is a parameter that can be changed at will. | 2 | Workload/Stress | | Algorithm | | Performance | Security |
| Avoid Artifacts with High Fan-In (Fan-In > X)The Fan-In of an Artifact is the number of other Artifacts that are referencing it. When computing the Fan-In of an Artifact, multiple accesses to it from the same Artifact are counted as one access. The threshold level is a parameter that can be changed at will. | 2 | Workload/Stress | | Algorithm | | Performance | Security |
| Avoid Artifacts with High Fan-Out (Fan-Out > X). The Fan-out of an Artifact is the number of other Artifacts that are referenced in it. When computing the Fan-Out of an Artifact, multiple accesses to the same component of an Artifact are counted as one access. The threshold is a parameter and can be changed at will. | 2 | Workload/Stress | | Algorithm | | Performance | Security |
| Avoid Artifacts with High Integration Complexity (IC greater than X ). Integration Complexity measures the number of independent integration paths. Integration paths are paths of the control flow graph in which another object is invoked. The threshold is a parameter and can be changed at will. Artifacts are | 3 | Interaction | | Function | | Standard | Security |

FIG. 24

| Error Text | Severity | Trigger | Target | Artifact Type | Qualifier | Impact | Category |
|---|---|---|---|---|---|---|---|
| Avoid Artifacts with High Integration Complexity (IC greater than X). Integration Complexity measures the number of independent integration paths. Integration paths are paths of the control flow graph in which another object is invoked. The threshold is a parameter and can be changed at will. | 2 | Workload/Stress | Requirements/Design Code) | Algorithm | Incorrect | Performance | Security |
| Avoid Artifacts with lines longer than 80 characters | 3 | Design Conformance | | Algorithm | | Standard | Technical Quality |
| Avoid artifacts with more than X parameters. The threshold X is a parameter and it can be changed at will. | 3 | Design Conformance | | Algorithm | | Standard | Technical Quality |
| Avoid call to AcceptChanges (of DataSet, DataTable etc) in loop as this have a negative impact on performance, | 3 | Design Conformance | | Algorithm | | Standard | Technical Quality |
| Avoid Classes implementing more than X Interfaces | 3 | Design Conformance | | Algorithm | | Standard | Technical Quality |
| Avoid Classes with a High Depth of Inheritance Tree (DIT greater than X+1). This means that the inheritance tree should have at most X levels. Depth of Inheritance Tree (DIT) is the maximum length of a path from a class to a root class in the inheritance structure of a system. DIT measures how many super-classes can affect a class. | 3 | Design Conformance | | Algorithm | | Standard | Technical Quality |
| Avoid Classes with a High Number Of Children (NOC > X) NOC is the number of immediate <Sub-Classes> of the Class. The threshold is a parameter and can be changed at will. | 3 | Design Conformance | | Algorithm | | Standard | Technical Quality |
| Avoid Classes with a High Public Data Ratio greater than X % Public Data Ratio is the percentage of public fields among all fields. The threshold is a parameter and can be changed at will. | 3 | Design Conformance | | Algorithm | | Standard | Technical Quality |
| Avoid Classes with High Coupling Between Object (CBO > X) The Coupling Between Object (CBO) is equal to the fan-out of a Class, that is, the number of other Classes that are referenced through one of its methods or one of its fields. The threshold is a parameter and can be changed at will. | 3 | Design Conformance | | Algorithm | | Standard | Security |
| Avoid Classes with High Lack of Cohesion in Methods (LCOM > X) LCOM is an indicator of a Class whose methods access few and different of its fields. The threshold is a parameter and can be changed at will. | 3 | Design Conformance | | Algorithm | | Standard | Technical Quality |

FIG. 25

| Error Text | Severity | Trigger | Target | Artifact Type | Qualifier | Impact | Category |
|---|---|---|---|---|---|---|---|
| Avoid Classes with High Weighted Methods per Class (WMC > X). The Weighted Methods per Class metric is defined as the sum of all the Classes method's cyclomatic complexity. The threshold is a parameter and can be changed at will. | 3 | Design Conformance | Requirement/Design/ Codes | Algorithm | | Standard | Technical Quality |
| Avoid Cobol Programs with a SELECT clause returning more than 9 columns. Such queries are considered complex. Changing threshold value requires a Metric Assistant configuration update. | 3 | Design Conformance | | Algorithm | Incorrect | Standard | Technical Quality |
| Avoid Cobol Programs with High Cyclomatic Complexity (CC greater than X). Cyclomatic Complexity is a measure of the complexity of the control structure of an Artifact. It is the number of linearly independent paths and therefore, the minimum number of independent paths when executing the software.  The threshold is a parameter and can be changed at will. | 3 | Design Conformance | | Algorithm | | Standard | Technical Quality |
| Avoid Cobol Programs with High Essential Complexity (EC greater than X). Essential Complexity measures the number of non-structured independent paths. Non-structured paths are paths of the control flow graph in which an instruction that interrupt the flow is present.  The threshold is a parameter and can be changed at will. | 3 | Design Conformance | | Algorithm | | Standard | Technical Quality |
| Avoid Cobol Programs with High Fan-In (Fan-In > X). The Fan-In of a program is the number of other programs that are referencing it. When computing the Fan-In of a program, multiple accesses to it from the same program are counted as one access.  The threshold level is a parameter that can be changed at will. | 2 | Workload/Stress | | Algorithm | | Performance | Security |

310 ⟵ (bracket grouping rows)

| Error Text | Severity | Trigger | Target | Artifact Type | Qualifier | Impact | Category |
|---|---|---|---|---|---|---|---|
| Avoid Cobol Programs with High Integration Complexity (IC greater than X). Integration Complexity measures the number of independent integration paths. Integration paths are paths of the control flow graph in which another object is invoked. | | | | | | | |
| The threshold is a parameter and can be changed at will. | 3 | Design Conformance | Requirements | Function | Incorrect | Standard | Security |
| Avoid Cobol Programs with High RAW SQL Complexity (SQL Complexity greater than X). Having complex queries in programs can cause performance problems. The threshold level is a parameter that can be changed at will. | 3 | Design Conformance | Design/Code | Algorithm | | Standard | Technical Quality |
| Avoid cyclic calls with PERFORM statements | | | | | | | |
| Note: The <%PARAM%> threshold parameter allows defining the maximal number of section/paragraph to cross for cycle detection. | 3 | Design Conformance | | Algorithm | | Standard | Technical Quality |
| Avoid declaring a Variable with 'Dim Var_Nam = ' | 3 | Design Conformance | | Algorithm | | Standard | Technical Quality |
| Avoid DISPLAY ... UPON CONSOLE | 3 | Design Conformance | | Algorithm | | Standard | Technical Quality |
| Avoid Functions / Procedures with a SELECT clause returning more than 9 columns or with a 'SELECT *' query. Such queries are considered complex. Changing threshold value requires a Metric Assistant configuration update. | 3 | Design Conformance | | Algorithm | | Standard | Technical Quality |
| Avoid Functions / Procedures with a SELECT clause returning more than 9 columns or with a 'SELECT *' query. Such queries are considered complex. Changing threshold value requires a Metric Assistant configuration update. | 3 | Design Conformance | | Algorithm | | Standard | Technical Quality |
| Avoid Functions / Procedures with High RAW SQL Complexity (SQL Complexity greater than X). RAW SQL Complexity measures the total number of tables used in FROM Clauses (Note: a single table used X times counts X). The threshold is a parameter and can be changed at will. | 3 | Design Conformance | | Algorithm | | Standard | Technical Quality |

FIG. 27

| Error Text | Severity | Trigger | Target | Artifact Type | Qualifier | Impact | Category |
|---|---|---|---|---|---|---|---|
| Avoid Functions / Procedures with queries on more than 4 Tables. Queries with more than 4 Tables is considered complex. Changing the threshold value requires Metric Assistant configuration update. | 3 | Design Conformance | Requirements | Algorithm | Incorrect | Standard | Technical Quality |
| Avoid Functions / Procedures with queries on more than 4 Tables. Queries with more than 4 Tables is considered complex. | | | | | | | |
| Changing the threshold value requires Metric Assistant configuration update. | 3 | Design Conformance | | Algorithm | | Standard | Technical Quality |
| Avoid GOTO jumps out of PERFORM range | 3 | Design Conformance | | Algorithm | | Standard | Technical Quality |
| Avoid having more than (>) X indexes (where X is a parameter) | 3 | Design Conformance | | Algorithm | | Standard | Technical Quality |
| Avoid High Response for a Class (RFC > X) RFC is the total number of local methods and remote methods called by methods in the Class. The threshold is a parameter and can be changed at will. | 3 | Design Conformance | | Algorithm | | Standard | Technical Quality |
| Avoid implement a loop with an inline PERFORM if it contains more than <%PARAM%> lines of code. | 3 | Design Conformance | | Algorithm | | Standard | Technical Quality |
| Avoid merging data files with the Cobol MERGE statement. | 3 | Design Conformance | | Algorithm | | Standard | Technical Quality |
| Avoid moving data through the CORRESPONDING clause | 3 | Design Conformance | | Algorithm | | Standard | Technical Quality |
| Avoid Paragraphs with more than X Lines of Code. | | | | | | | |
| The threshold is a parameter and can be changed at will. | 3 | Design Conformance | | Algorithm | | Standard | Technical Quality |
| Avoid Procedure Paragraphs that contains no statements | 3 | Design Conformance | | Algorithm | | Standard | Technical Quality |
| Avoid Procedure Sections that contain no Paragraphs. | 3 | Design Conformance | | Algorithm | | Standard | Technical Quality |
| Avoid Programs with more than X Lines of Code. | | | | | | | |
| The threshold is a parameter and can be changed at will. | 3 | Design Conformance | | Algorithm | | Standard | Technical Quality |

FIG. 28

| Error Text | Severity | Trigger | Target | Artifact Type | Qualifier | Impact | Category |
|---|---|---|---|---|---|---|---|
| Avoid recursive calls with PERFORM statements | 3 | Design Conformance | Requirements | Algorithm | Incorrect | Standard | Technical Quality |
| Avoid Sections with more than X Lines of Code. | 3 | Design Conformance | /Design/Code | Algorithm | | Standard | Technical Quality |
| The threshold is a parameter and can be changed at will. | | | | | | | |
| Avoid sorting data files with the Cobol SORT statement. | 3 | Design Conformance | | Algorithm | | Standard | Technical Quality |
| Avoid Stored Procedures doing an Insert, Update or Delete and not managing a transaction (execute "begin tran" if @@trancount=0) | 3 | Design Conformance | | Function | | Standard | Security |
| Avoid Stored Procedures not returning a status value (RETURN) | 3 | Design Conformance | | Algorithm | | Standard | Technical Quality |
| Avoid stored procedures or functions doing Insert, Update, Delete, Select or Create Table and not including error management (check @@error variable). | 3 | Design Conformance | | Algorithm | | Standard | Technical Quality |
| Avoid Tables accessed directly from client-side SQL queries | 3 | Sequencing | | Algorithm | | Standard | Security |
| Avoid Tables with more than 20 columns on an OLTP system | 3 | Design Conformance | | Algorithm | | Standard | Technical Quality |
| Avoid using "truncate table". | 3 | Design Conformance | | Algorithm | | Standard | Technical Quality |
| Avoid using Cursors | 3 | Design Conformance | | Algorithm | | Standard | Technical Quality |
| Avoid using GOTO statement | 3 | Design Conformance | | Algorithm | | Standard | Technical Quality |
| Avoid using HANDLE ABEND | 3 | Design Conformance | | Algorithm | | Standard | Technical Quality |
| Avoid using IGNORE CONDITION | 3 | Design Conformance | | Algorithm | | Standard | Technical Quality |
| Avoid using main programs and nested subprograms in the same source file. | 3 | Design Conformance | | Algorithm | | Standard | Technical Quality |
| Avoid using mechanisms which are difficult to understand and which can generate troubles in data manipulations. | 3 | Design Conformance | | Algorithm | | Standard | Technical Quality |
| Avoid using NEXT SENTENCE | 3 | Design Conformance | | Algorithm | | Standard | Technical Quality |
| Avoid using opening or closing a file inside a loop (PERFORM - TIMES, PERFORM - UNTIL and PERFORM - VARYING). | 3 | Design Conformance | | Algorithm | | Standard | Technical Quality |
| Avoid using PERFORM ... THROUGH / THRU | 3 | Design Conformance | | Algorithm | | Standard | Technical Quality |

FIG. 29

| Error Text | Severity | Trigger | Target | Artifact Type | Qualifier | Impact | Category |
|---|---|---|---|---|---|---|---|
| Avoid using the Cobol ALTER statement to manage the control flow. | 3 | Design Conformance | Requirements | Algorithm | Incorrect | Standard | Technical Quality |
| Avoid using the STOP RUN statement to terminate a program. | 3 | Design Conformance | /Design/Code | Algorithm | | Standard | Technical Quality |
| Avoid using Untyped DataSet. This also apply to DataTables and DataRows. | 3 | Design Conformance | | Algorithm | | Standard | Technical Quality |
| CE (also known as Outgoing Dependencies or the Number of Types outside a namespace that Types of the namespace Depend on) indicates the number of other namespaces that classes and interfaces in the analyzed namespace depend upon. This is an indicator of the namespace's independence. | | | | | | | |
| Classes should have at least a ratio comment/code > X %. The threshold is a parameter and can be changed at will. | 3 | Design Conformance | | Algorithm | | Standard | Security |
| Classes should have comments | 3 | Design Conformance | | Algorithm | | Standard | Technical Quality |
| Classes should have less than X Constructors. The threshold is a parameter and can be changed at will. | 3 | Design Conformance | | Algorithm | | Standard | Technical Quality |
| Classes should have less than X Methods. The threshold is a parameter and can be changed at will. | 3 | Design Conformance | | Algorithm | | Standard | Technical Quality |
| Commented-out Code Lines/Code Lines ratio measures the amount of code left in comments versus the size of the source code (excluding comments and blank lines) this is done for a given artifact. | 3 | Design Conformance | | Algorithm | | Standard | Technical Quality |
| Commented-out Code Lines/Code Lines ratio measures the amount of code left in comments versus the size of the source code (excluding comments and blank lines) this is done for a given module. | 3 | Design Conformance | | Algorithm | | Standard | Technical Quality |
| Complexity Volume (% of LoC) measure the rate of high and very high complexity evaluated as a % of the number of code lines of the application. Instead of measuring the percentage number of artifacts that do not comply with cyclomatic complexity thresholds, it measures the percentage of code lines that do not comply with cyclomatic complexity thresholds. | 3 | Design Conformance | | Algorithm | | Standard | Technical Quality |
| Data Access must be based on Stored Procedure Calls. | 2 | Variation | | Algorithm | | Standard | Security |

310

3000

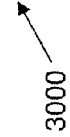

FIG. 30

| Error Text | Severity | Trigger | Target | Artifact Type | Qualifier | Impact | Category |
|---|---|---|---|---|---|---|---|
| Depth of Code is measured as the maximum number of nested control statements in an artifact. For example, an artifact that contains an IF statement which contains a While loop which itself contains another IF statement will have a Depth of Code of 3 (at least). Avoid Artifacts with Depth of Code (DoC) greater than X. The threshold level is a parameter that can be changed at will. | 3 | Design Conformance | Requirements | Algorithm | Incorrect | Standard | Technical Quality |
| Depth of Code is measured as the maximum number of nested control statements in an artifact. For example, an Artifact that contains an IF statement which contains a While loop which itself contains another IF statement will have a Depth of Code of 3 (at least). | 3 | Design Conformance | /Design/Code | Algorithm | | Standard | Technical Quality |
| Avoid Artifacts with Depth of Code (DoC) greater than X. The threshold level is a parameter that can be changed at will. | 3 | Design Conformance | | Function | | Standard | Technical Quality |
| Depth of Code is measured as the maximum number of nested control statements in an artifact. For example, an artifact that contains an IF statement which contains a While loop which itself contains another IF statement will have a Depth of Code of 3 (at least). Avoid Artifacts with Depth of Code (DoC) greater than X. The threshold level is a parameter that can be changed at will. | 3 | Design Conformance | | Algorithm | | Standard | Technical Quality |
| Depth of nested subqueries is measured as the maximum number of nested subqueries in a given artifact. Nested subqueries are subqueries of subqueries. While subqueries can possibly cause performance issues, high depth of nested subqueries is a greater source of performance issues. | 3 | Design Conformance | | Algorithm | | Standard | Technical Quality |
| EVALUATE statements must be closed by END-EVALUATE terminator and not by a period. | 3 | Design Conformance | | Algorithm | | Standard | Technical Quality |
| Finds all loops (for, while, do while) termination that call a method. | 3 | Design Conformance | | Algorithm | | Standard | Technical Quality |
| For better readability and portability, Cobol Programs should not have lines longer than 80 characters. | 3 | Design Conformance | | Algorithm | | Standard | Technical Quality |

FIG. 31

| Error Text | Severity | Trigger | Target | Artifact Type | Qualifier | Impact | Category |
|---|---|---|---|---|---|---|---|
| Functional Evolvability measures how much the existing structure taken as whole is filled up with logic (technical and business logic). | | | | | | | |
| Functional Evolvability is computed the following way: Functional Evolvability = ( 100 x Number of Functional Paths / Maximum Number of Functional Paths) Where : Number of Functional Paths = Sum of Cyclomatic Complexity of all the Artifacts of the module, Maximum Number of Functional Paths = Number of Artifacts * High Cyclomatic Complexity Threshold | 3 | Design Conformance | Requirements | Algorithm | Incorrect | Standard | Technical Quality |
| Functions / Procedures should not use Group By clause in SQL statement | 3 | Design Conformance | /Design/Code | Algorithm | | Standard | Technical Quality |
| Functions / Procedures should not use SQL statement including Subqueries (at least subqueries should be avoided). | 3 | Design Conformance | | Algorithm | | Standard | Technical Quality |
| Functions and Procedures should have at least a ratio comment / code >= X  The threshold is a parameter and can be changed at will. | 3 | Design Conformance | | Algorithm | | Standard | Technical Quality |
| Functions and procedures should have comments | 3 | Design Conformance | | Algorithm | | Standard | Technical Quality |
| Functions, Procedures and Packages should have at least a ratio comment / code >= X | 3 | Design Conformance | | Algorithm | | Standard | Technical Quality |
| The threshold is a parameter and can be changed at will. | | | | | | | |
| If a program calls the same subprogram via dynamic calls multiple times (set by the <%PARAM%> parameter), then it is better to use static calls rather than dynamic calls. | 3 | Design Conformance | | Algorithm | | Standard | Technical Quality |
| IF statements must be closed by END-IF terminator and not by a period. | 3 | Design Conformance | | Algorithm | | Standard | Technical Quality |
| Include a WHEN OTHER clause when using EVALUATE. | 3 | Design Conformance | | Algorithm | | Standard | Technical Quality |
| Interfaces should have at least a ratio comment/code > X %  The threshold is a parameter and can be changed at will. | 3 | Design Conformance | | Algorithm | | Standard | Technical Quality |

FIG. 32

| Error Text | Severity | Trigger | Target | Artifact Type | Qualifier | Impact | Category |
|---|---|---|---|---|---|---|---|
| Interfaces should have less than X Methods. The threshold is a parameter and can be changed at will. In C## interfaces are pure virtual classes. | 3 | Design Conformance | Requirements | Algorithm | Incorrect | Standard | Technical Quality |
| Interfaces should not be implemented on Structures | 3 | Design Conformance | /Design/Code | Algorithm | | Standard | Technical Quality |
| Keywords should not be used as names | 3 | Design Conformance | | Assignment | | Standard | Technical Quality |
| List all indexes that are redundant i.e. indexes on the same column(s) or included into another composite index. | 3 | Design Conformance | | Algorithm | | Standard | Technical Quality |
| List all objects using UNION (without ALL). | 3 | Design Conformance | | Algorithm | | Standard | Technical Quality |
| List all SQL Artifacts except tables having a query that has a cartesian join, i.e: that does not explicitly state a join condition among the tables  A cartesian join is found if, for any of the table in the from clause, no column of the table is found in a join (either in the from or where clause). | | | | | | | |
| List all SQL Artifacts except tables having a query that has a cartesian join, i.e: that does not explicitly state a join condition among the tables | 3 | Design Conformance | | Algorithm | | Standard | Technical Quality |
| A cartesian join is found if, for any of the table in the from clause, no column of the table is found in a join (either in the from or where clause). | | | | | | | |
| List all tables that do not have a clustered index | 3 | Design Conformance | | Algorithm | | Standard | Technical Quality |
| List of all tables  not involved in a Foreign Key (FK) | 3 | Design Conformance | | Algorithm | | Standard | Technical Quality |
| List of database tables that have more than X characters. The length is a parameter that can be changed at will. | | | | | | | Technical Quality |
| List of H Procedures and Functions with more than 1 statement per line | 3 | Design Conformance | | Algorithm | | Standard | Technical Quality |

| Error Text | Severity | Trigger | Target | Artifact Type | Qualifier | Impact | Category |
|---|---|---|---|---|---|---|---|
| List of schema tables that are not called | 3 | Design Conformance | Requirements | Algorithm | Incorrect | Standard | Technical Quality |
| List of schema tables that have more than <%PARAM%> columns | | | | | | | |
| The threshold is a parameter and can be changed at will. | 3 | Design Conformance | /Design/Code | Algorithm | | Standard | Technical Quality |
| Logical file description clause (FD) defined in the FILE SECTION of the DATA DIVISION must have a clause specifying the block size. This clause must be set to 0 records. | 3 | Design Conformance | | Algorithm | | Standard | Technical Quality |
| Long and long raw datatypes should not be used for table columns. | 3 | Design Conformance | | Algorithm | | Standard | Technical Quality |
| Maintainability of the code is facilitated if there is documentation in the code. This rule will ensure there are comments within the Functions and Procedures. | 3 | Design Conformance | | Algorithm | | Standard | Technical Quality |
| Methods should have at least a ratio comment/code > X %. The threshold is a parameter and can be changed at will. | 3 | Design Conformance | | Algorithm | | Standard | Technical Quality |
| Methods should have comments | 3 | Design Conformance | | Algorithm | | Standard | Technical Quality |
| Methods should not have more than X lines of code. The threshold is a parameter and can be changed at will. | 3 | Design Conformance | | Algorithm | | Standard | Technical Quality |
| Names of Classes should start with an uppercase character and should not include any underscore | 3 | Design Conformance | | Algorithm | | Standard | Technical Quality |
| Names of Controls should respect naming conventions (btn* for buttons, chk* for check boxes, cmb* for combo boxes,) and should not include any underscore. The list of Controls can be updated by editing the diagnostic Stored Procedure. | 3 | Design Conformance | | Algorithm | | Standard | Technical Quality |
| Names of Enumerations Items should start with an uppercase character and should not include any underscore | 3 | Design Conformance | | Algorithm | | Standard | Technical Quality |
| Names of Enumerations should start with an uppercase character and should not include any underscore | 3 | Design Conformance | | Algorithm | | Standard | Technical Quality |

| Error Text | Severity | Trigger | Target | Artifact Type | Qualifier | Impact | Category |
|---|---|---|---|---|---|---|---|
| Names of Functions should start with X. | 3 | Design Conformance | | Algorithm | | Standard | Technical Quality |
| The prefix value is a parameter that can be changed at will | 3 | Design Conformance | Requirements | | Incorrect | | |
| Names of Interfaces should start with X, with an uppercase second character and should not include any underscore. The prefix value is a parameter that can be changed at will | 3 | Design Conformance | /Design/Code | Algorithm | | Standard | Technical Quality |
| Names of Methods should start with an uppercase character (except set/get/op) and should not include any underscore | 3 | Design Conformance | | Algorithm | | Standard | Technical Quality |
| Names of Packages should start with X. | 3 | Design Conformance | | Algorithm | | Standard | Technical Quality |
| The prefix value is a parameter that can be changed at will | 3 | Design Conformance | | Algorithm | | Standard | Technical Quality |
| Names of Private Fields should not start with an uppercase character and should not include any underscore | 3 | Design Conformance | | Algorithm | | Standard | Technical Quality |
| Names of Procedures should start with X. The prefix value is a parameter that can be changed at will | 3 | Design Conformance | | Algorithm | | Standard | Technical Quality |
| Names of Procedures should start with X. | 3 | Design Conformance | | Algorithm | | Standard | Technical Quality |
| The prefix value is a parameter that can be changed at will | 3 | Design Conformance | | Algorithm | | Standard | Technical Quality |
| Names of Properties should start with an uppercase character and should not include any underscore | 3 | Design Conformance | | Algorithm | | Standard | Technical Quality |
| Names of Public Fields should start with an uppercase character and should not include any underscore | 3 | Design Conformance | | Algorithm | | Standard | Technical Quality |
| Names of Sections should start with X. | 3 | Design Conformance | | Algorithm | | Standard | Technical Quality |
| The prefix value is a parameter that can be changed at will | 3 | Design Conformance | | Algorithm | | Standard | Technical Quality |
| Names of Tables should start with X. The prefix value is a parameter that can be changed at will | 3 | Design Conformance | | Algorithm | | Standard | Technical Quality |

FIG. 35

| Error Text | Severity | Trigger | Target | Artifact Type | Qualifier | Impact | Category |
|---|---|---|---|---|---|---|---|
| Names of Views should start with X. The prefix value is a parameter that can be changed at will | 3 | Design Conformance | Requirements | Algorithm | Incorrect | Standard | Technical Quality |
| Namespaces should start with an uppercase character | 3 | Design Conformance | /Design/Code | Algorithm |  | Standard | Technical Quality |
| Nested Stored Procedures should not use temporary Tables | 3 | Design Conformance |  | Algorithm |  | Standard | Technical Quality |
| Overriding of Static Methods is not allowed. This metric retrieves all static method that are redefined in subclasses i.e. "implicitly overridden". A Static Method MyMethod of Class MySuperClass is "implicitly overridden" in Subclass MySubClass if MySubClass contains a similar declaration of MyMethod (i.e. same signature). |  |  |  |  |  |  |  |
| Paragraphs should have comments to describe the actions which are carried out. | 3 | Design Conformance |  | Function |  | Standard | Technical Quality |
| Programs accessing a database should include the SQLCA copybook which defines the error handling variables. | 3 | Design Conformance |  | Algorithm |  | Standard | Technical Quality |
| Programs should have at least a ratio comment/code > X %. The threshold is a parameter and can be changed at will. | 3 | Design Conformance |  | Algorithm |  | Standard | Technical Quality |
| Programs should have comments | 3 | Design Conformance |  | Algorithm |  | Standard | Technical Quality |
| Programs should not contain Pointers. | 3 | Design Conformance |  | Algorithm |  | Standard | Technical Quality |
| Public Class Fields should not be used | 3 | Design Conformance |  | Algorithm |  | Standard | Technical Quality |
| Queries using Group By is considered complex and not performant. | 3 | Design Conformance |  | Algorithm |  | Standard | Technical Quality |
| Queries with more than 4 Tables is considered complex. | 3 | Design Conformance |  | Algorithm |  | Standard | Technical Quality |
| Queries with sub queries is considered complex. | 3 | Design Conformance |  | Algorithm |  | Standard | Technical Quality |
| Reports all artifacts with loops (for, while, do while) that contain object instantiations (object creation)...NET artifacts include all methods and constructors. | 3 | Design Conformance |  | Timing/Serialization |  | Standard | Technical Quality |
| Reports all methods with loops (for, while, do while) that contains a try/catch block. | 3 | Design Conformance |  | Algorithm |  | Standard | Technical Quality |
| Sections should have at least a ratio comment/code > X %. The threshold is a parameter and can be changed at will. | 3 | Design Conformance |  | Algorithm |  | Standard | Technical Quality |
| Sections should have at least a ratio comment/code > X %. The threshold is a parameter and can be changed at will. | 3 | Design Conformance |  | Algorithm |  | Standard | Technical Quality |

FIG. 36

| Error Text | Severity | Trigger | Target | Artifact Type | Qualifier | Impact | Category |
|---|---|---|---|---|---|---|---|
| Sections should have comments | 3 | Design Conformance | Requirements | Algorithm | Incorrect | Standard | Technical Quality |
| Some Cobol statements must not be used in programs running under the CICS environment : ACCEPT, ENTRY, DISPLAY, OPEN, CLOSE, READ, WRITE, REWRITE, DELETE, MERGE, SORT, START, STOP In addition, the Cobol programs must use CICS files only. In conclusion, CICS programs must not contain Cobol file declaration. | 3 | Design Conformance | /Design/Code | | | | |
| SQL connection should be closed within the Method / Function / Sub that opened it | 3 | Design Conformance | | Algorithm | | Standard | Security |
| String.Empty should not be used | 3 | Design Conformance | | Algorithm | | Standard | Technical Quality |
| The access to a logical file defined in a program must take into account the status defined in JCL for the associated data set via the DISP parameter of the corresponding DD card. | 3 | Design Conformance | | Assignment | | Standard | Technical Quality |
| The purpose of this diagnostic is to detect calls to the DataReader's ExecuteReader method made without the use the CommandBehavior.CloseConnection style. This diagnostic is valid for any class that the inherit directly or indirectly from IDataReader including SqlDataReader, OleDbDataReader, OracleDataReader, OdbcDataReader. | 3 | Design Conformance | | Algorithm | | Standard | Security |
| The SEARCH ALL statement must be used only with sorted tables | 3 | Design Conformance | | Algorithm | | Standard | Technical Quality |
| The SYNCHRONIZED clause can improve performance for binary items. | 3 | Design Conformance | | Algorithm | | Standard | Technical Quality |
| The Varchar2 type helps saving space in the database tables. It should be used instead of char/varchar | 3 | Design Conformance | | Algorithm | | Standard | Security |
| This diagnostic lists all Dispose methods with no try finally block or with no call to .finalize() within the finally block. This applies only for Dispose(bool) method defined in classes which implement the IDisposable interface. | 3 | Design Conformance | | Algorithm | | Standard | Technical Quality |

| Error Text | Severity | Trigger | Target | Artifact Type | Qualifier | Impact | Category |
|---|---|---|---|---|---|---|---|
| This diagnostic lists all the artifacts (methods, events) belonging to User Interface classes that are using directly objects from the database. User Interface classes are classes belonging to User Interface namespaces such as WinForms or namespaces used for web pages implementation. The list of these namespaces are parameters of the diagnostic. | 1 | Interaction | Requirements | Assignment | Incorrect | Capability | Security |
| This metric detects SQL Artifacts accessing a cursor inside a loop | 3 | Design Conformance | /Design/Code | Algorithm | | Standard | Technical Quality |
| This metric detects tables having too many ways to insert data into them. It retrieves table having more than X artifacts inserting these tables, where X a configurable parameter. | 2 | Workload/Stress | | Algorithm | | Performance | Security |
| This metric detects tables having too many ways to update them. It retrieves tables having more than X artifacts updating these tables, where X a configurable parameter. | 2 | Workload/Stress | | Algorithm | | Performance | Security |
| This metric is based on the ratio between the volume of duplicated, copy/pasted artifacts measure in Number of code lines and the total number of code lines. | 3 | Design Conformance | | Algorithm | | Standard | Security |
| This metric list all locations where the DataSource member is set before the ValueMember/DisplayMember. | 3 | Design Conformance | | Algorithm | | Standard | Technical Quality |
| This metric list all objects where calls to Items.Add (of WinForm controls) are done in loops without using BeginUpdate/EndUpdate. | 3 | Design Conformance | | Algorithm | | Standard | Technical Quality |
| This metric lists all the location where a call to a Select method is done on a DataTable in a loop. | 3 | Design Conformance | | Algorithm | | Standard | Technical Quality |
| This metric measures the ratio between the number of duplicated, copy/pasted artifacts and the total number of artifacts. | 3 | Design Conformance | | Algorithm | | Standard | Security |
| This metric reports all methods catching an exception of type Exception. The exception Exception should never been caught in a catch statement. | 3 | Design Conformance | | Algorithm | | Standard | Technical Quality |
| This metric reports all methods having at least one empty catch block (empty or have only comments). In a try and Catch statement, Catch blocks should have code to handle the thrown exception. If they are empty or have only comments, the Exception will not be handled. | 3 | Design Conformance | | Algorithm | | Standard | Technical Quality |

FIG. 38

| Error Text | Severity | Trigger | Target | Artifact Type | Qualifier | Impact | Category |
|---|---|---|---|---|---|---|---|
| This metric reports all methods throwing an exception of type Exception. The exception Exception should never be thrown. | 3 | Design Conformance | Requirements | Algorithm | | Standard | Technical Quality |
| This metric reports all namespaces that have one-on-one and more static circular dependencies. Dependencies mean: - references through static methods call - references through class fields - references through inheritance Note that all these links are static link and not runtime. The threshold parameter permit to define the maximal number of namespaces to cross for a cycle. Note that cycle notion means here a directed path in a graph that is directed by dependencies relations. | 2 | Workload/Stress | /Design/Code | Algorithm | Incorrect | Performance | Security |
| This metric retrieves all artifacts that are explicitly calling themselves (recursive call). Only executable artifacts are considered. | 3 | Design Conformance | | Algorithm | | Standard | Technical Quality |
| This metric retrieves all artifacts using at least one SQL query inside a loop statement. | 3 | Design Conformance | | Algorithm | | Standard | Technical Quality |
| This metric retrieves all client-server artifacts that contain an SQL query with a WHERE clause not using the first column of composite index (multiple column base index). The value of the metric is number of client-server artifacts that contain an SQL query not using the first column of a composite index divided by the number of client-server artifacts using a composite index. An artifacts using a composite index means here artifacts containing a query that uses at least one column of a composite index. | 3 | Design Conformance | | Algorithm | | Standard | Technical Quality |
| This metric retrieves all client-server artifacts that contain an SQL query with a WHERE clause not using the first column of composite index (multiple column base index). The value of the metric is number of client-server artifacts that contain an SQL query not using the first column of a composite index divided by the number of client-server artifacts using a composite index. An artifacts using a composite index means here artifacts containing a query that uses at least one column of a composite index. XXL tables are extremely large tables which contain a huge amount of data. The threshold that determines when a table is considered to contain a huge amount of data can be configured by the user. | 3 | Design Conformance | | Algorithm | | Standard | Technical Quality |

| Error Text | Severity | Trigger | Target | Artifact Type | Qualifier | Impact | Category |
|---|---|---|---|---|---|---|---|
| This metric retrieves all database triggers which directly access tables for update, insert or delete operations. | 2 | Coverage | Requirements | Function | Incorrect | Standard | Security |
| This metric retrieves all methods that call the get accessor of a property inside a loop whenever the accessor returns a cloned object. A cloned object is retrieved from a call to the System.ICloneable.Clone method. | 3 | Design Conformance | /Design/Code | Algorithm | | Standard | Technical Quality |
| This metric retrieves all SQL artifacts that have a query using functions on indexed columns in WHERE clause. It retrieves all SQL artifacts with a WHERE clause using a function that takes a table column used as a database index as a function parameter (except specific indexes such as function-based indexes). | 3 | Design Conformance | | Algorithm | | Standard | Technical Quality |
| This metric retrieves all SQL artifacts that have a query using functions on indexed columns in WHERE clause. | 3 | | | | | | |
| It retrieves all SQL artifacts with a WHERE clause using a function that takes a table column used as a database index as a function parameter (except specific indexes such as function-based indexes). | | Design Conformance | | Algorithm | | Standard | Technical Quality |
| This metric retrieves all SQL artifacts with a query using implicit type conversion. | 3 | Design Conformance | | Algorithm | | Standard | Technical Quality |
| This metric retrieves the artifacts containing at least one SQL Query not using a table's indexes. An SQL Query is using table's indexes if all the following conditions are true: - At least one index is defined for each table participating in the from list - Queries must reference left-most columns of the index key - Data matching where clause criterias are highly selective  where  selectivity = 1/density  low density  high number = high selectivity = low density high number = low selectivity = high density  selectivity specify percentage of rows that match where clause criterias.   Low number is linked to a high selectivity. If selectivity is 100%, all values of the index key are differents and index is useful (best case) high number is linked to low selectivity: if density is 100%, all values are identical and index is inefficient. | 3 | Design Conformance | | Algorithm | | Standard | Technical Quality |

FIG. 40

| Error Text | Severity | Trigger | Target | Artifact Type | Qualifier | Impact | Category |
|---|---|---|---|---|---|---|---|
| Triggers should have at least a ratio comment/code > X % | 3 | Design Conformance | Requirements | Algorithm | Incorrect | Standard | Technical Quality |
| The threshold is a parameter and can be changed at will. | 3 | Design Conformance | /Design/Code | Algorithm | | Standard | Technical Quality |
| Triggers should have comments | 3 | Design Conformance | | Algorithm | | Standard | Technical Quality |
| Triggers should not modify data in a Table which has a Trigger for this action | 3 | Design Conformance | | Algorithm | | Standard | Security |
| Triggers, Views, Functions and Procedures should not use temporary Objects (except temporary Tables) | 3 | Design Conformance | | Algorithm | | Standard | Technical Quality |
| Using Execute immediate allows to dynamically create the query from strings, but leads to some performance problems. The execution plan cannot be stored in memory and thus needs to be calculated each time. | 3 | Design Conformance | | Algorithm | | Standard | Technical Quality |
| Using the "rule" hints are not supported in Oracle 10 G anymore. | | | | | | | |
| Utility classes must have a private default constructor. They also must not have other constructors. Default constructors are constructors without any parameter. Utility classes are static classes: all their fields and methods are static. | 3 | Design Conformance | | Algorithm | | Standard | Technical Quality |
| When a program calls a large subprogram (which contains <%PARAM%>) lines of code), then it is better to use a dynamic call rather than a static call. | 3 | Design Conformance | | Algorithm | | Standard | Technical Quality |
| WHEN OTHERS must be present in exception management | 3 | Design Conformance | | Algorithm | | Standard | Technical Quality |

FIG. 41

Trigger summary

| Accessibility | | 5915 | 5920 |
|---|---|---|---|
| 5905 → | Coverage | Sev1 | 20 |
| | | Sev2 | 8 |
| | | Sev3 | 13 |
| | Variation | Sev1 | 3 |
| | | Sev2 | 17 |
| | | Sev3 | 7 |
| Memory | Variation | Sev1 | 28 |
| | Workload/Stress | | 32 |

| Security | | | | 5900 |
|---|---|---|---|---|
| | Coverage | Sev1 | 9 | |
| | | Sev2 | 5 | |
| | | Sev3 | 2 | |
| | Variation | Sev1 | 22 | |
| | | Sev2 | 22 | |
| | | Sev3 | 6 | |
| | | Sev4 | 2 | |
| | Sequencing | Sev1 | 4 | |
| | | Sev2 | 7 | |
| | | Sev3 | 4 | |
| | Interaction | Sev1 | 4 | |
| | | Sev2 | 4 | |
| | | Sev3 | 0 | |
| | | Sev4 | 3 | |
| | Workload/Stress | Sev1 | 3 | |
| | | Sev2 | 5 | |
| | | Sev3 | 1 | |
| | | Sev4 | 3 | |

| Technical Quality | | | |
|---|---|---|---|
| | Coverage | Sev1 | 52 |
| | | Sev2 | 24 |
| | | Sev3 | 24 |
| | Variation | Sev1 | 12 |
| | | Sev2 | 37 |
| | | Sev3 | 17 |

FIG. 59

SYSTEM AND METHOD TO CLASSIFY AUTOMATED CODE INSPECTION SERVICES DEFECT OUTPUT FOR DEFECT ANALYSIS

FIELD OF THE INVENTION

The present invention generally relates to defect analysis, and more particularly, to a method and system to classify automated code inspection services defect output for defect analysis.

BACKGROUND

While software systems continue to grow in size and complexity, business demands continue to require shorter development cycles. This has led software developers to compromise on functionality, time to market, and quality of software products. Furthermore, the increased schedule pressures and limited availability of resources and skilled labor can lead to problems such as incomplete design of software products, inefficient testing, poor quality, high development and maintenance costs, and the like. This may lead to poor customer satisfaction and a loss of market share for companies developing software.

To improve product quality, many organizations devote an increasing share of their resources to testing and identifying problem areas related to software and the process of software development. Accordingly, it is not unusual to include a quality assurance team in software development projects to identify defects in the software product during and after development of a software product. By identifying and resolving defects before marketing the product to customers, software developers can assure customers of the reliability of their products, and reduce the occurrence of post-sale software fixes such as patches and upgrades which may frustrate their customers.

Software testing may involve verifying the correctness, completeness, security, quality, etc. of a product. During testing, a technical investigation may be performed by, for example, executing a program or application with the intent to find errors. If errors are found, one or more areas in the software code may be identified based on the errors. Therefore, developers may alter the code in the identified regions to obviate the error.

After a defect has been fixed, data regarding the defect, and the resolution of the defect, may be stored in a database. The defects may be classified and analyzed as a whole using, for example, Orthogonal Defect Classification (ODC) and/or a defect analysis starter/defect reduction method (DAS/DRM), which is described in U.S. Patent Application Publication No. 2006/0265188, U.S. Patent Application Publication No. 2006/0251073, and U.S. Patent Application Publication No. 2007/0174023, the contents of each of which are hereby incorporated by reference herein in their entirety. ODC is a commonly used complex quality assessment schema for understanding code related defects uncovered during testing.

It is widely accepted in the testing industry that the least expensive defects to fix are those found earliest in the life cycle. However, a problem in complex system integration testing is that there may be very few comprehensive opportunities for projects to remove defects cost effectively prior to late phase testing, and by that point in the life cycle (i.e., late phase testing) defects are relatively expensive to fix. Furthermore, for many projects there are particular kinds of high impact exposures, e.g., defects in the area of security, that are critical to find and fix, but are also difficult to test.

There are numerous automated code inspection tools available on the market today designed to address this problem; however, for many projects, it is not cost effective for an organization to purchase licenses for all of the tools needed to cover all of the exposures of interest to them. Moreover, even if it was cost effective for an organization to purchase licenses for all of the tools needed to cover all of the exposures, there is no way to understand the return on this investment in terms of the impact on reducing the numbers of defects found in late phase testing and in production.

As a result of these impracticalities, few complex system integration projects avail themselves of automated code inspection defect removal strategies, even though applying them to unit tested code prior to beginning system testing is one of the most cost effective options available. This problem has been addressed in part by, e.g., a service provider assembling a set of code inspection tools designed to address four areas, as shown in TABLE 1 below.

TABLE 1

| Types of analysis: | Functional Outputs | Technologies supported | Static Code analysis | Dynamic Code analysis |
|---|---|---|---|---|
| 1 | Industry and Best Practice Standards Compliance | Maintainability, Robustness, Quality, Changeability, Performance, Programming Practices, Architectural Design, Documentation | COBOL, C++, J2EE/JAVA, ABAP, Microsoft.NET | X |
| 2 | Security | Application Privacy, Authentication, Authorization, Client-side Attacks, Command Execution, Information Disclosure, Location, Logical Attacks | Web Applications | X |
| 3 | Memory Management | Memory leaks, Memory access errors, Memory state tracking, Quantify for application performance profiling, Coverage | Web Applications | X |
| 4 | Usability and Accessibility | Accessibility | Web Applications | X |

With this approach, for example, a project (e.g., a software project of an organization) can purchase code inspection services from the service provider on an as-needed basis without requiring any tool purchase or licensing costs for tools they may only need to leverage on a limited basis. Thus, a project may, for example, utilize a plurality of code inspection services (e.g., specifically tailored for their project) and receive code inspection services reports from the service provider. By assembling a set of code inspection tools and providing for purchase of code inspection services on an as-needed basis, utilization of these code inspection services is rendered more cost effective.

However, no defect analysis schema capable of accurately measuring value received from performing specific automated code inspection activities is known to exist. Thus, there is no way to understand the return on this investment (e.g., the purchase of code inspection services) in terms of the impact on reducing the numbers of defects found in late phase testing and in production. That is, the code inspection services reports (for example, from the plurality of code inspection services, e.g., specifically tailored for their project) do not interpret defects uncovered via the automated code inspection subscription service. Rather, such code inspection service reports, for example, only identify defects uncovered via the automated code inspection subscription service. Thus, this automated code inspection subscription service does not allow projects to accurately assess the impact of automated code inspections on, for example, critical exposure areas and does not allow for effective planning of, for example, late phase testing and production support needs.

Accordingly, there exists a need in the art to overcome the deficiencies and limitations described hereinabove.

SUMMARY

In a first aspect of the invention, a method is implemented in a computer infrastructure having computer executable code tangibly embodied on a computer readable storage medium having programming instructions. The programming instructions are operable to receive a tool error output determined by a code inspection tool and select at least one defect classification mapping profile based on the code inspection tool. Additionally, the programming instructions are operable to map the tool error output to one or more output classifications using the selected at least one defect classification mapping profile and generate at least one report based on the one or more output classifications.

In another aspect of the invention, a system comprises an error output receiving tool operable to receive a tool error output determined by a code inspection tool and a selection tool operable to select at least one defect classification mapping profile based on the code inspection tool. Additionally, the system comprises a defect classification mapping tool operable to map the tool error output to one or more output classifications using the selected at least one defect classification mapping profile and a report generation tool operable to generate at least one report based on the one or more output classifications.

In an additional aspect of the invention, a computer program product comprising a computer usable storage medium having readable program code embodied in the medium is provided. The computer program product includes at least one component operable to receive a tool error output determined by a code inspection tool and select at least one defect classification mapping profile based on the code inspection tool. Additionally, the at least one component is operable to map the tool error output to one or more output classifications using the selected at least one defect classification mapping profile and generate at least one defect analysis metric based on the one or more output classifications.

In a further aspect of the invention, a computer system for classifying automated code inspection services defect output for defect analysis, the system comprises a CPU, a computer readable memory and a computer readable storage media. Additionally, the system comprises first program instructions to receive a tool error output determined by a code inspection tool and second program instructions to select at least one defect classification mapping profile based on the code inspection tool. Furthermore, the system comprises third program instructions to map the tool error output to one or more output classifications using the selected at least one defect classification mapping profile and fourth program instructions to generate at least one defect analysis metric based on the one or more output classifications. The first, second, third and fourth program instructions are stored on the computer readable storage media for execution by the CPU via the computer readable memory

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

FIGS. 3-18 illustrate exemplary defect classification mapping profiles for different functional areas of code for a first code inspection service in accordance with aspects of the invention;

FIG. 19 illustrates an exemplary defect classification mapping profile for a second code inspection service in accordance with aspects of the invention;

FIG. 21 illustrates an additional exemplary defect classification mapping profile for a fourth code inspection service in accordance with aspects of the invention;

FIGS. 22-41 illustrate exemplary defect classification mapping profiles which list possible tool error outputs for a fifth code inspection service in accordance with aspects of the invention;

FIG. 59 illustrates a trigger summary in accordance with aspects of the invention.

DETAILED DESCRIPTION

Figure 1:
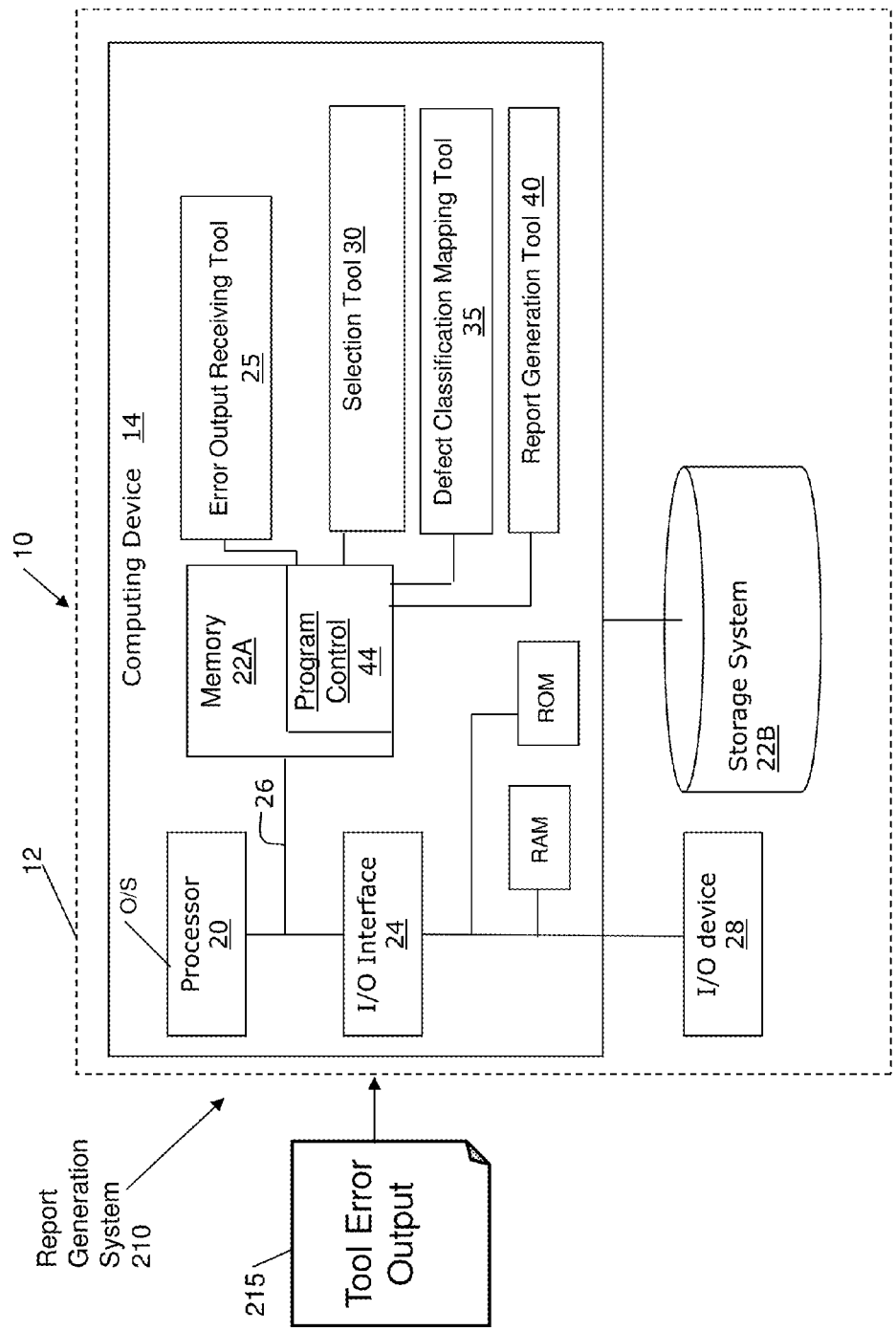
FIG. 1 shows an illustrative environment for implementing the steps in accordance with aspects of the invention.

The present invention generally relates to defect analysis, and more particularly, to system and method to classify automated code inspection services defect output for defect analysis. The present invention utilizes defect classification field rules (e.g., in accordance with a common schema) for classifying and interpreting defects uncovered via automated code inspection subscription service. More specifically, the present invention establishes automated classification rules to interpret the defects uncovered via various automated code inspection tools (e.g., WebKing®, CAST, Purify Plus™, AppScan®, and ABAP Code Optimizer, amongst other code inspection tools) so that projects can more effectively plan late phase testing needs and reduce high risk or impact defects that would likely otherwise have escaped into production. (Purify Plus and AppScan are trademarks of International Business Machines Corporation in the United States, other countries, or both. WebKing is a trademark of Parasoft Corporation in the United States, other countries, or both.)

Implementing the present invention, leveraging multiple code inspection tools in a defect removal/analysis test service at the unit test phase of the life cycle, enables projects to realize significant cost savings because, for example, finding and fixing high value defects at this relatively early phase (i.e., unit test) is far less expensive than attempting to find and fix defects in any of the late phase tests (e.g., after unit test), or especially in production. The present invention also enables projects to measure the impact of finding and/or fixing these defects on later test phases. For example, if the project has already adequately addressed security concerns in the automated code inspection, the organization can reduce or eliminate test cases from the execution plan and move to production earlier without sacrificing quality or increasing risk.

In embodiments, projects can select any combination of tools to be applied to their code (e.g., WebKing, CAST, Purify Plus, AppScan, and ABAP Code Optimizer). Once the selected tools have been applied to the code under test, the output from the inspection (i.e., from the selected tools) is received by a report generation system including a defect classification mapping tool in accordance with the present invention. As discussed further below, the defect classification mapping tool applies a set of defect classification rules and, in embodiments, a report generation tool produces, for example, an overall defect analysis report based on the output of the defect classification mapping tool.

By implementing the present invention, an organization may allow projects to accurately assess the impact of automated code inspections on critical exposure areas, which can in turn be used to more effectively plan late phase testing and production support needs. For example, the defect analysis report will provide insights that will enable projects to optimize, for example, their go-forward test planning.

System Environment

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

an electrical connection having one or more wires,
a portable computer diskette,
a hard disk,
a random access memory (RAM),
a read-only memory (ROM),
an erasable programmable read-only memory (EPROM or Flash memory),
an optical fiber,
a portable compact disc read-only memory (CDROM),
an optical storage device,
a transmission media such as those supporting the Internet or an intranet, or
a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as JAVA, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1). In embodiments, the environment 10 may be designated as a report generation system 210.

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/ resource 28 may be for example, a handheld device, PDA, handset, keyboard etc. In embodiments, the defect classification mapping profiles may be stored in storage system 22B or another storage system, which may be, for example, a database.

In general, the processor 20 executes computer program code (e.g., program control 44), which can be stored in the memory 22A and/or storage system 22B. Moreover, in accordance with aspects of the invention, the program control 44 controls the error output receiving tool 25, the selection tool 30, the defect classification mapping tool 35 and the report generation tool 40. While executing the computer program code, the processor 20 can read and/or write data to/from memory 22A, storage system 22B, and/or I/O interface 24. The program code executes the processes of the invention such as, for example, the processes of the output receiving tool 25, the selection tool 30, the defect classification mapping tool 35 and the report generation tool 40. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

As illustrated in FIG. 1, the error output receiving tool 25 is operable to receive the output of selected code inspection services. Additionally, the selection tool 30 is operable to select an appropriate defect classification mapping profile from a storage system (e.g., storage system 22B) containing classification mapping profiles for each of the code inspection services. Furthermore, the defect classification mapping tool 35 is operable to map the output of the selected code inspection services using the selected defect classification mapping profile(s). The report generation tool 40 is operable to generate a report that includes defect analysis metrics, e.g., the processes described herein. The error output receiving tool 25, the selection tool 30, the defect classification mapping tool 35 and the report generation tool 40 can be implemented as one or more program code in the program control 44 stored in memory 22A as separate or combined modules.

Error Output Receiving Tool

The error output receiving tool 25 is operable to receive the output of selected code inspection services. More specifically, as discussed further below, in embodiments, the output of selected code inspection services will contain, for example, one or more error texts. Each error text may be specific to a particular type of error detected by a particular code inspection service. The error output receiving tool 25 is operable to receive one or more error texts from one or more particular code inspection services, as described further below.

In embodiments, the error output receiving tool 25 is operable to receive an indication of which code inspection tools were utilized in the code inspection services based on the received output of selected code inspection services. Additionally, in embodiments, the error output receiving tool 25 is operable to determine which code inspection tools were utilized in the code inspection services based on the received output of selected code inspection services. For example, in embodiments, the error output receiving tool 25 may access a listing of the different possible outputs of the code inspection services (e.g., error texts) for the different code inspection services (e.g., WebKing, CAST, Purify Plus, AppScan, and ABAP Code Optimizer). The error output receiving tool 25 may compare the output received from the selected code inspection services (e.g., the error texts), for example, for a particular organization's code, to the listing of the different possible outputs to determine which code inspection service or services (e.g., WebKing, CAST, Purify Plus, AppScan, and ABAP Code Optimizer) have been used to test the organization's code. As discussed further below, the determination of which code inspection services have been used to test an organization's code is sent to the selection tool 30 to enable the selection tool 30 to select appropriate defect classification mapping profiles.

Selection Tool

The selection tool 30 is operable to select an appropriate defect classification mapping profile from a defect analysis starter (DAS)/defect reduction method (DRM) storage system 220 (which may be stored in storage system 22B shown in FIG. 1) containing classification mapping profiles for each of the code inspection services. That is, the output of code inspection services, e.g., error texts, may be specific to particular code inspection services. As such, the selection tool 30 is operable to select an appropriate defect classification mapping profile, e.g., one or more defect classification mapping profiles that are specific to the one or more code inspection services used to test code. For example, if the WebKing code inspection tool was used to test, e.g., an organization's code (for example as determined by the error output receiving tool 25), then the selection tool 30 is operable to select one or more defect classification mapping profiles specific to the WebKing code inspection tool. The selected one or more defect classification mapping profiles is utilized by the defect classification mapping tool 35 to enable the defect classification mapping tool 35 to map the output of the selected code inspection services (e.g., the error texts) using the selected defect classification mapping profile(s), as discussed further below.

Mapping Tool

The defect classification mapping tool 35 is operable to map the output of the selected code inspection services using the selected defect classification mapping profile(s), e.g., selected by the selection tool 30. For example, as discussed further below, the defect classification mapping tool 35 may receive the output of selected code inspection services (e.g., from the error output receiving tool 25) and quantify the occurrences of each possible tool error outputs for each of the selected code inspection services.

Additionally, the defect classification mapping tool 35 is operable to map each of the error outputs to its respective classifications (e.g., target, trigger, impact, type, qualifier and severity level, amongst other classifications) using the appropriate defect classification mapping profile defect. Furthermore, the defect classification mapping tool 35 is operable to quantify the defects by one or more of the classifications (e.g., target, trigger, impact, type, qualifier and severity level, amongst other classifications).

Report Generation Tool

In accordance with further aspects of the invention, the report generation tool 40 is operable to generate a report containing, e.g., defect analysis metrics, using the classified tool output information, e.g., received from the defect classification mapping tool 35. In embodiments, the report generation tool 40 may report defect discoveries and provide detailed reports of findings, including mitigated risk. Additionally, the generated reports may be used to analyze and/or measure the results, and highlight error prone areas. Furthermore, the present invention may be used to quantify the extent to which specific defect categories were shifted earlier in the software life cycle (e.g., when defects may be less expensive to remedy), and to identify opportunities to prevent the injection of the high priority defects. A report may include a Rough Order of Magnitude business case reflecting cost reduction opportunity (for example, earlier defect removal, cycle time reduction, and prevention of defect injection).

In embodiments, for example, the report generation tool 40 may provide a report containing an analysis or assessment. The assessment may include for each of technical quality, security, memory and accessibility, a rating of results against expectation and error prone area identification with implications.

Additionally, the report may include an indication of opportunities for improvement. In embodiments, the indication of opportunities for improvement may include trends, implications, opportunities and/or recommendations. Furthermore, the report may include a high level business case including high level cost of initiatives, e.g., reflecting cost reduction opportunity and rough order of magnitude/benefits. Additionally, the report may describe significant and/or critical analysis results, which, for example, may be the metric results rated as the most significant results associated with defect removal (e.g., of the selected one or more code inspection services) and/or in terms of the greatest opportunity to prevent defect injection. The report may also include a histogram of defects found, for example, by tool error category and implications. Exemplary reports in accordance with aspects of the present invention are discussed further below.

Exemplary High Level Flow

Figure 2:
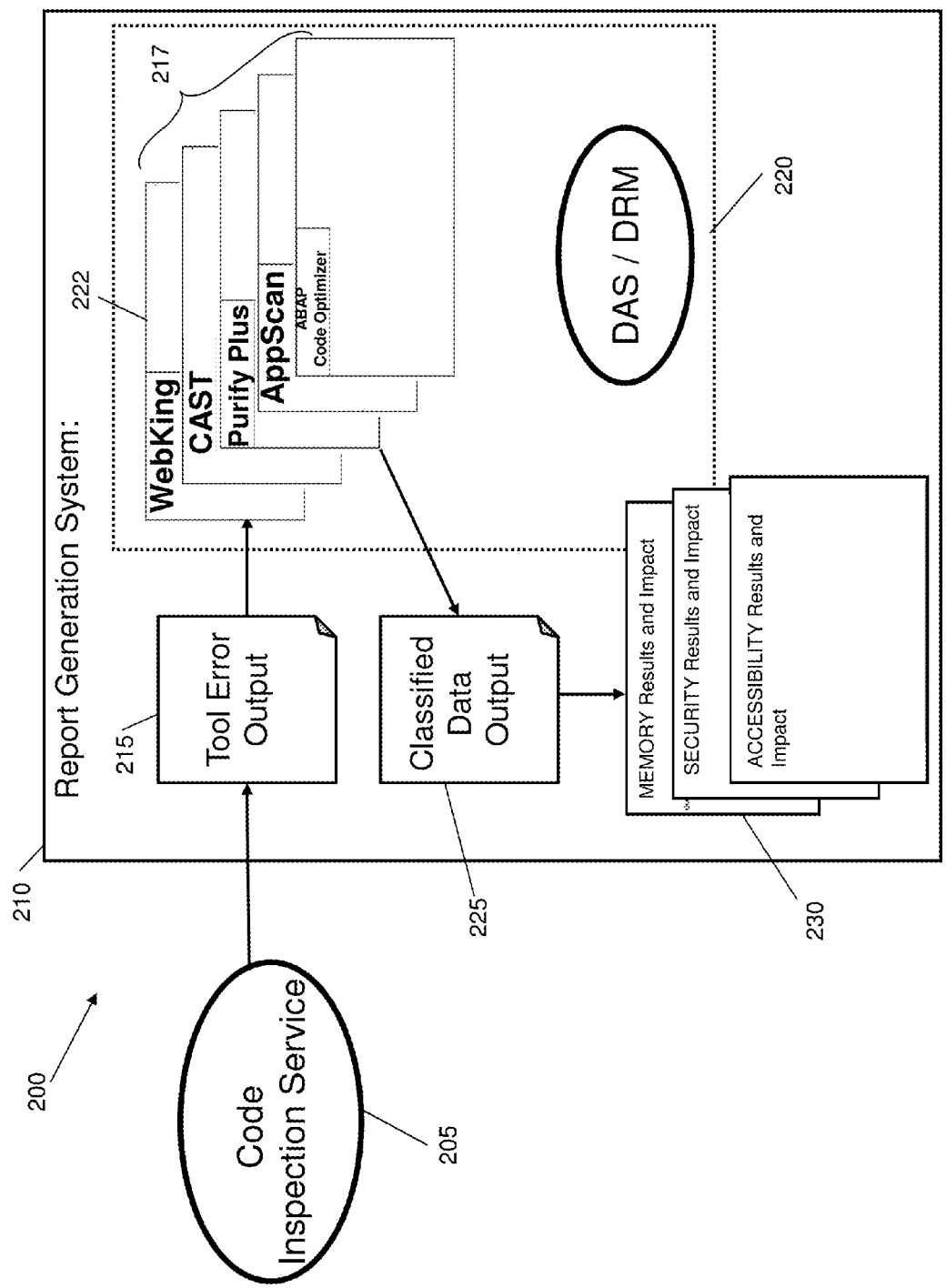
FIG. 2 shows an exemplary depiction of a high level flow in accordance with aspects of the invention.

FIG. 2 illustrates a high level flow 200 in accordance with aspects of the invention. As shown in FIG. 2, a code inspection service 205 (e.g., an automated code inspection service) is performed on code, e.g., provided by a client, which creates output information (e.g., tool error output 215). As described above, in embodiments, a particular client may use a single automated code inspection service or multiple code inspection services. Additionally, a single code inspection service may comprise multiple code inspection tools (e.g., WebKing, CAST, Purify Plus, AppScan, and ABAP Code Optimizer). The tool error output 215 is received by the report generation system 210 (also shown in FIG. 1).

In embodiments, the report generation system 210 receives the output 215 of selected code inspection services, e.g., using the error output receiving tool 25 (shown in FIG. 1), and accesses one or more appropriate defect classification mapping profiles 217 from a DAS/DRM storage system 220, e.g., using the selection tool 30 (shown in FIG. 1). Additionally, the report generation system 210 maps the output of the selected code inspection services using the selected defect classification mapping profile(s) 217, e.g., using the defect classification mapping tool 35, and generate a report that includes defect analysis metrics, e.g., using the report generation tool 40 (shown in FIG. 1).

For example, as discussed further below, if a WebKing automated code inspection service has been utilized, the report generation system 210 (e.g., the error output receiving tool 25) receives the output 215 of selected code inspection services. Additionally, the report generation system 210 accesses the WebKing defect classification mapping profile(s) 222 from the DAS/DRM storage system 220 (e.g., using the selection tool 30). Utilizing the appropriate defect classification mapping profile(s), the report generation system 210 (e.g., the defect classification mapping tool 35) classifies (or maps) the tool output information (e.g., the tool error output 215). The report generation system 210 (e.g., the report generation tool 40) then uses the classified tool output information to generate a report containing, e.g., defect analysis metrics.

Defect Classification Mapping Profiles

FIGS. 3-41 illustrate exemplary defect classification mapping profiles for five code inspection tools (WebKing, CAST, Purify Plus, AppScan, and ABAP Code Optimizer) in accordance with aspects of the invention. However, these exemplary defect classification mapping profiles should not be considered exhaustive of all defect classification mapping profiles. That is, the invention contemplates that other code inspection tools may be utilized. As such, the invention contemplates that additional defect classification mapping profiles may be tailored to these other code inspection tools. Additionally, while FIGS. 3-41 illustrate exemplary defect classification mapping profiles in a tabular format, the invention contemplates other formats for the defect classification mapping profiles. As such, the exemplary defect classification mapping profiles of FIGS. 3-41 should not be construed as limiting the present invention.

FIGS. 3-18 illustrate exemplary defect classification mapping profiles for different functional areas of code for the WebKing code inspection service. More specifically, FIGS. 3-18 illustrate exemplary defect classification mapping profiles for a WebKing error output (e.g., one of the tools included in the code inspection service) to five specific Defect Reduction Method (DRM) fields/attributes: trigger, target, impact, type and qualifier, and a severity level.

A "trigger" indicates how a defect was discovered (e.g., the circumstances surrounding the defect discovery). A "target" indicates a high level cause of the defect. As with the present invention, the code inspection services identify code defects, for each of the exemplary defect classification mapping profiles, the target should be "requirements/design/code." An "impact" indicates an impact to a user. For example, "accessibility" indicates whether a handicapped individual can attain access.

A "type" (or "artifact type") indicates what was fixed, specifying, for example, the size and complexity of what was fixed. For example, were just a few lines of code fixed or was a large amount of code fixed. Exemplary types include "assignment," indicating a simple fix, "checking," indicating a more complex fix, and "algorithm," which is more complex than both the assignment and checking types. A "qualifier" indicates whether errors found are related to, e.g., incorrect, extraneous or missing code. In accordance with aspects of the invention, by combining the type and qualifier, the present invention is able to determine where an error was injected into the project. A "severity" indicates a relative severity of the error. In embodiments, depending upon which code inspection services are utilized by a client, the severity may have a value of between 1 (most severe) and 3 (least severe), with other severity levels contemplated by the invention. The severity may provide insight, for example, as to where processes may be weak.

FIG. 3 shows an exemplary defect classification mapping profile 300 for "Images and Animations" functional area of a WebKing code inspection service. As shown in FIG. 3, exemplary defect classification mapping profile 300 includes a tool error output column 305, which lists possible tool error outputs 310 (e.g., error text). As should be understood, the list of possible tool error outputs 310 is not exhaustive, and the invention contemplates that other possible tool error outputs may also be included in a defect classification mapping profile, in accordance with aspects of the invention. For example, in embodiments, the list of possible tool error outputs 310 may be dynamic, such that new possible tool error outputs may be added to the tool error output column 305.

Additionally, the invention contemplates that a particular tool error output for a particular code inspection tool representative of a particular code defect may change. For example, newer versions of a code inspection tool may identify a defect by with a new tool error output (as compared to an older version of the code inspection tool). As such, the list of possible tool error outputs 310 is not exhaustive, and the invention contemplates that other possible tool error outputs may also be included in a defect classification mapping profile, in accordance with aspects of the invention.

As shown in FIG. 3, with defect classification mapping profile 300 each of the possible tool error outputs 310 (e.g., error texts) include an acronym 315, text 320 and bracketed information 325. The acronym 315 (e.g., "SV," "PSV" or "V") indicates whether the defect is a severe violation, possible severe violation or a violation, respectively. The text 320 indicates some corrective action and the bracketed information 325 provides code location information (e.g., pointing a programmer to the appropriate section of code containing the identified error). As those of ordinary skill in the art would readily understand the information contained in the tool error output column 305, no further explanation is necessary for an understanding of the present invention.

Additionally, FIG. 3 includes a tool error output classification 330 for each of the possible tool error outputs 310 (e.g., error texts). More specifically, the exemplary defect classification mapping profile 300 includes a target/trigger/impact column 335, which indicates the target, the trigger and the impact for each of the possible tool error outputs 310. As shown in FIG. 3, as with the present invention, the code inspection services identify code defects, for each of the exemplary defect classification mapping profiles, the target will be "requirements/design/code." Moreover, as indicated in FIG. 3, for each of the "Images and Animations" tool error output, the trigger is "variation" and the impact is "accessibility." As should be understood, while illustrated as a single column, target/trigger/impact column 335 may be depicted as, e.g., three discrete columns.

The exemplary defect classification mapping profile 300 includes a type column 340, which indicates what was fixed, specifying, for example, the size and complexity of what was fixed. As indicated in FIG. 3, types for this exemplary defect classification mapping profile 300 include "assignment," and "algorithm." As discussed above, "assignment," indicates, for example, a simple fix, whereas "algorithm" indicates, for example, a more complex fix. Additionally, the exemplary defect classification mapping profile 300 includes a qualifier column 345, indicating whether the error found is related to, e.g., incorrect, extraneous or missing code. The exemplary defect classification mapping profile 300 further includes a severity column 350, which indicates a relative severity of the error. In embodiments, depending upon which code inspection services are utilized by a client, the severity may have a value of between 1 (most severe) and 3 (least severe), with other severity values contemplated by the invention.

In accordance with aspects of the invention, the values for the tool error output classification 330 (e.g., the values of columns 335, 340, 345 and 350) have been determined for each of the possible tool error outputs 310. More specifically, values for the tool error output classification 330 have been determined based on review of historical code defects (e.g., contained in a defect analysis starter/defect reduction method (DAS/DRM) project repository) and, for example, patterns discovered from the historic code defects. That is, as described above, after a defect has been fixed, data regarding the defect (e.g., target, trigger, impact, type and qualifier), and the resolution of the defect, may be stored in a database. For example, the database of past defects (which include, for example, for each defect an indication of the defect's target, trigger, impact, type and qualifier) may be used to determine associations between each possible tool error output 310 and their respective tool output classifications (e.g., target, trigger, impact, type, qualifier and severity level, amongst other classifications), as exemplified by defect classification mapping profile 300.

Additionally, in accordance with aspects of the present invention, with exemplary defect classification mapping profile 300 values for the severity column 350 may be derived from the acronym 315 (e.g., "SV," "PSV" or "V"). For example, a tool error output 305 indicating a severe violation (SV) is assigned a severity level of "1," whereas a possible severe violation (PSV) is assigned a severity level of "2," and a violation (V) is assigned a severity level of "3."

While the exemplary defect classification mapping profile 300 includes a listing of possible tool error outputs 310 for each code inspection service, the invention contemplates that additional possible tool error outputs 310 may arise. For example, a particular code inspection service may designate a new tool error output. As such, the exemplary defect classification mapping profile 300 (or any other defect classification mapping profile) should not be construed as limiting the present invention.

FIGS. 4-18 illustrate additional exemplary defect classification mapping profiles 400-1800, which list additional possible tool error outputs for different functional areas (e.g., non-text content, image maps, captions, etc.) of the WebKing code inspection service. Each of the additional exemplary defect classification mapping profiles 400-1800 are derived and used in a similar manner to exemplary defect classification mapping profile 300. However, as explained above, each of the exemplary defect classification mapping profiles 400-1800 are for different functional areas of the WebKing code inspection service. As such, each of the exemplary defect classification mapping profiles 400-1800 may have different possible tool error outputs 310 (e.g., error texts). As each of the additional exemplary defect classification mapping profiles 400-1800 are derived and used in a similar manner to exemplary defect classification mapping profile 300, a further description of FIGS. 4-18 is not necessary for those of ordinary skill in the art to practice the invention.

FIG. 19 illustrates an additional exemplary defect classification mapping profile 1900 for the Purify Plus code inspection service. The exemplary defect classification mapping profile 1900 is derived and used in a similar manner to exemplary defect classification mapping profiles 300-1800. However, as explained above, exemplary defect classification mapping profile 1900 is for the Purify Plus code inspection service. As such, exemplary defect classification mapping profile 1900 may have different possible tool error outputs 310. Additionally, exemplary defect classification mapping profile 1900 includes a separate column for trigger, as the trigger varies depending on the tool error output 310. As exemplary defect classification mapping profile 1900 is derived and used in a similar manner to exemplary defect classification mapping profiles 300-1800, a further description of FIG. 19 is not necessary for those of ordinary skill in the art to practice the invention.

Figure 20:
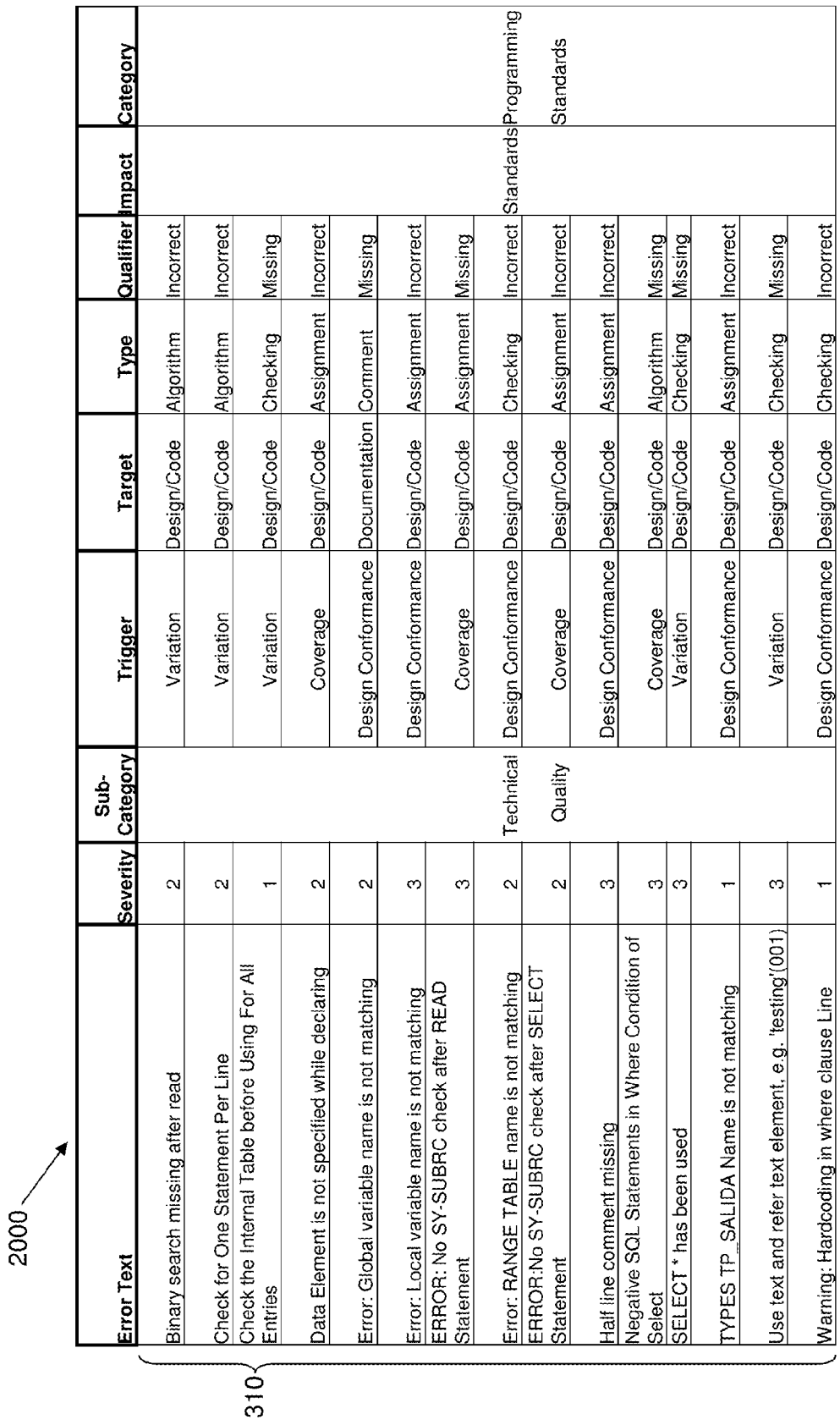
FIG. 20 illustrates an exemplary defect classification mapping profile for a third code inspection service in accordance with aspects of the present invention.

FIG. 20 illustrates an additional exemplary defect classification mapping profile 2000 for the ABAP Code Optimizer code inspection service. The exemplary defect classification mapping profile 2000 is derived and used in a similar manner to exemplary defect classification mapping profiles 300-1900. However, as explained above, exemplary defect classification mapping profile 2000 is for the ABAP Code Optimizer code inspection service. As such, exemplary defect classification mapping profile 2000 may have different possible tool error outputs 310. Additionally, exemplary defect classification mapping profile 2000 includes additional classifications (e.g., category and sub-category). As exemplary defect classification mapping profile 2000 is derived and used in a similar manner to exemplary defect classification mapping profiles 300-1900, a further description of FIG. 20 is not necessary for those of ordinary skill in the art to practice the invention.

FIG. 21 illustrates an additional exemplary defect classification mapping profile 2100 for of the APPScan code inspection service. The exemplary defect classification mapping profile 2100 is derived and used in a similar manner to exemplary defect classification mapping profiles 300-2000. However, as explained above, exemplary defect classification mapping profile 2100 is for the APPScan code inspection service. As such, exemplary defect classification mapping profile 2100 may have different possible tool error outputs 310. As exemplary defect classification mapping profile 2100 is derived and used in a similar manner to exemplary defect classification mapping profiles 300-2000, a further description of FIG. 21 is not necessary for those of ordinary skill in the art to practice the invention.

FIGS. 22-41 illustrate exemplary defect classification mapping profiles 2200-4100, which list possible tool error outputs for the CAST code inspection service. Each of the exemplary defect classification mapping profiles 2200-4100 are derived and used in a similar manner to exemplary defect classification mapping profiles 300-2100. However, each of the exemplary defect classification mapping profiles 2200-4100 is for the CAST code inspection service. As such, for example as shown in FIG. 22, each of the exemplary defect classification mapping profiles 2200-4100 may have different possible tool error outputs 310. As each of the exemplary defect classification mapping profiles 2200-4100 are derived and used in a similar manner to exemplary defect classification mapping profiles 300-2100, a further description of FIGS. 22-41 is not necessary for those of ordinary skill in the art to practice the invention.

As can be observed from the exemplary defect classification mapping profiles 300-4100 and as discussed further below, the present invention is operable to translate the outputs of the different code inspection services to one or more standardized metrics, e.g., in accordance with a common schema. That is, for each of the different possible code error outputs of the different code inspection services, as shown in FIGS. 3-41, the DAS/DRM defect profiles 300-4100 indicate metrics, e.g., severity, target, trigger, impact, type and qualifier, in accordance with the common schema. In this way, the classification mapping of the present invention enables defect analysis reporting, e.g., of the metrics, of defects identified, for example, from different code inspection tools.

Exemplary Reports

FIGS. 42-59 illustrate exemplary reports (or components of a report) in accordance with aspects of the invention. However, these exemplary reports should not be considered as exhaustive of all reports contemplated by the invention. That is, the invention contemplates that the report generation tool 40 may generate other reports. Additionally, while FIGS. 44-58 illustrate exemplary reports as histograms, the invention contemplates other formats for the reports. As such, the exemplary reports (or components of reports) of FIGS. 42-59 should not be construed as limiting the present invention. In embodiments, the present invention is operable to transform the output 215 of selected code inspection services to one or more reports that include defect analysis metrics.

Figure 42:
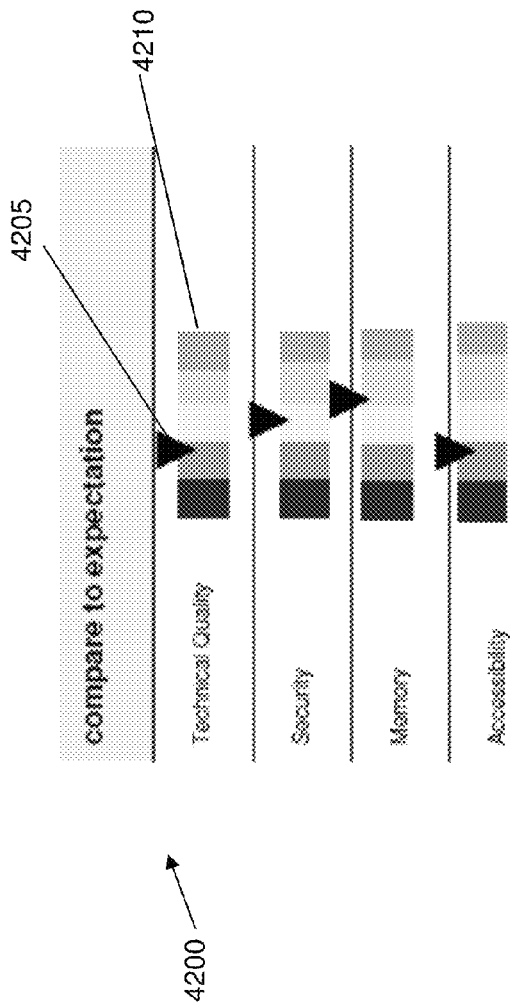
FIG. 42 illustrates an exemplary assessment including a rating of results against expectation for each of technical quality, security, memory and accessibility in accordance with aspects of the present invention.
Figure 43:
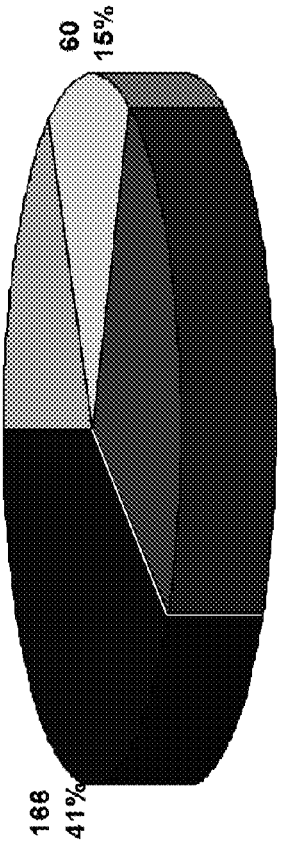
FIG. 43 illustrates an exemplary quantification of error types in accordance with aspects of the present invention.

As discussed above, in embodiments, for example, the report generation tool 40 may provide a report containing an analysis or assessment. The assessment may include for each of technical quality, security, memory and accessibility, a rating of results against expectation and error prone area identification with implications. In embodiments, the present invention is operable to manipulate, e.g., map, the output of the selected code inspection services using the selected defect classification mapping profile(s) 217 to generate the report that includes defect analysis metrics, e.g., using the report generation tool 40 (shown in FIG. 1). FIG. 42 illustrates an exemplary assessment 4200 including a rating of results 4205 against expectation 4210 for each of technical quality, security, memory and accessibility. FIG. 43 illustrates an exemplary quantification of error types (e.g., technical quality, security, memory and accessibility) in terms of KLOC (thousand of lines of code) and percentage of total errors.

Figure 44:
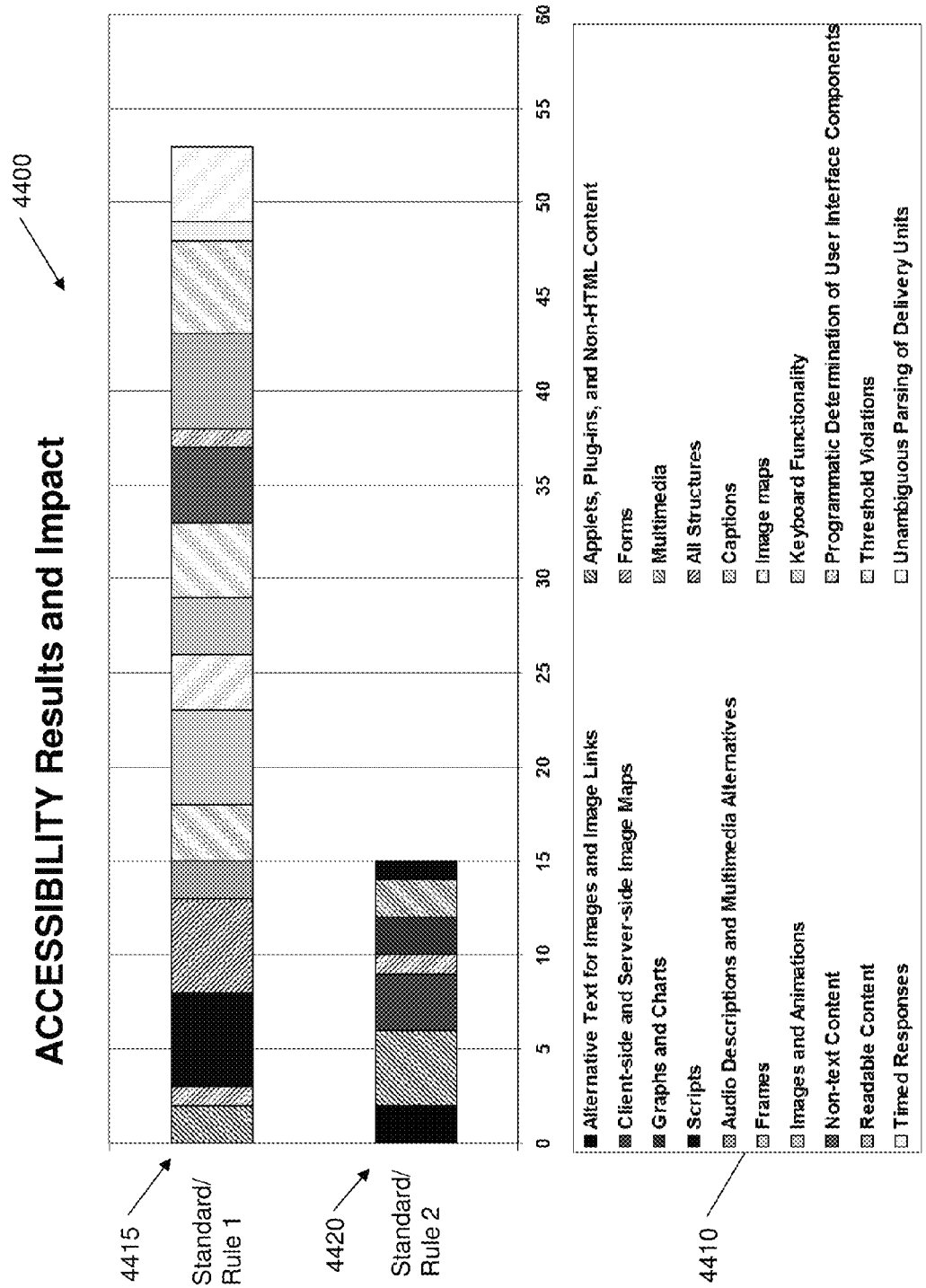
FIGS. 44-46 illustrate exemplary histograms in accordance with aspects of the present invention.

FIG. 44 illustrates an exemplary histogram 4400 of defects found by tool error category, and implications. In accordance with aspects of the invention, the report generation tool 40 may generate a histogram, e.g., exemplary histogram 4400 of defects found by tool error category, and implications, as a report or as a component of a report. Additionally, in embodiments, the histogram 4400 may indicate subcategories, if they are defined. More specifically, FIG. 44 illustrates a quantification of accessibility defects found using a particular code inspection service for two rules and/or industry standards (e.g., "Standard/Rule 1" and "Standard/Rule 2"). Accessibility errors, for example, may relate to a standard of rules for handicapped, disabled or senior users. The different possible defects (e.g., frames, forms, captions, etc.) are listed in the table key 4410 and identified by, e.g., different pattern and/or shades. Thus, as can be observed in exemplary histogram 4400, with Standard/Rule 1, approximately fifty-three errors are detected and with Standard/Rule 2, approximately fifteen errors are detected.

While exemplary histogram 4400 quantifies defects found by tool error category, and implication, this information is limited to what an automated tool can look for. Additionally, exemplary histogram 4400 may not allow for any conclusions (e.g., future planning) as no particular defect significantly stands out more than any other defect.

Figure 45:
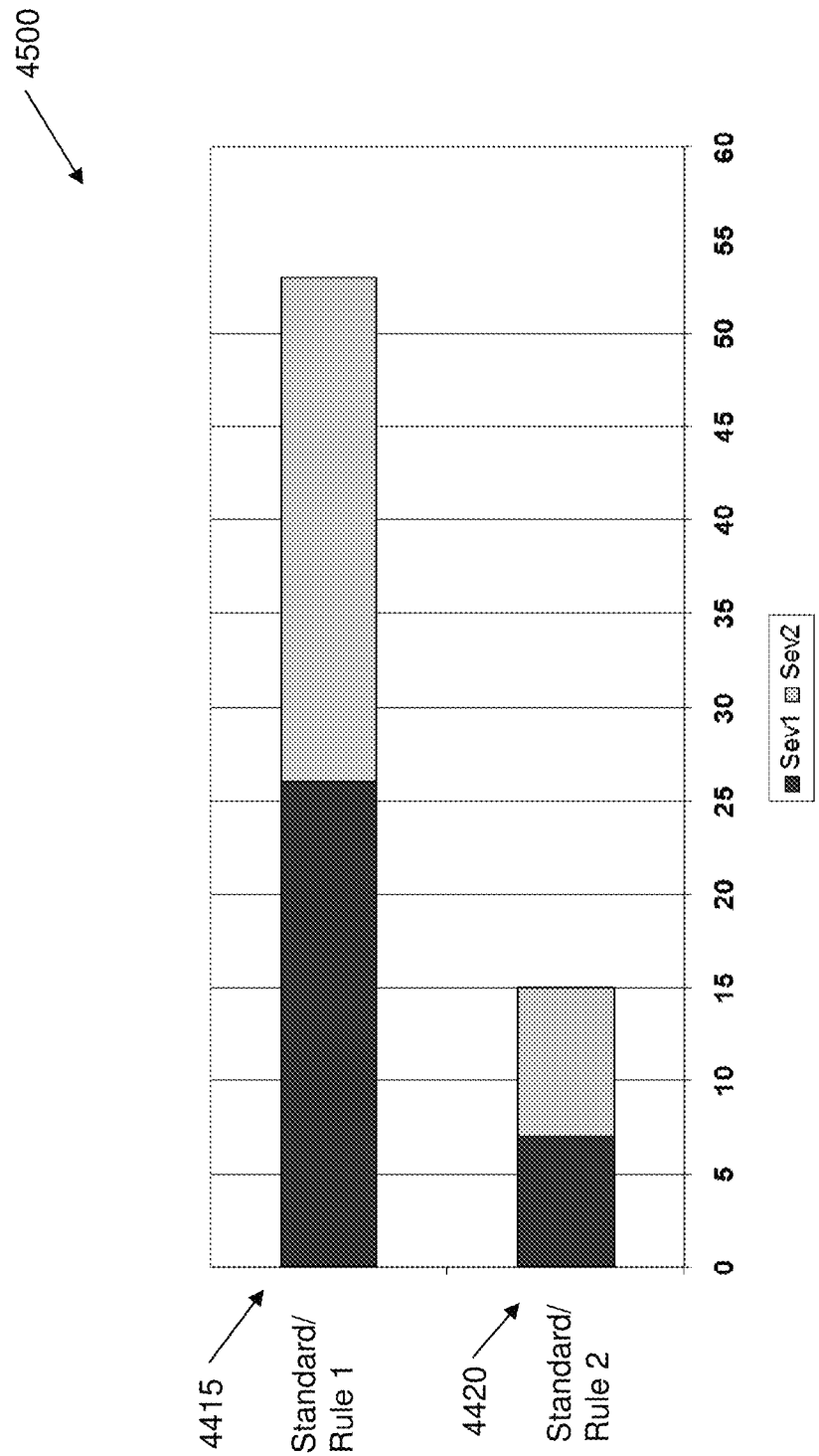

FIG. 45 illustrates an exemplary histogram of defects by severity 4500. More specifically, FIG. 45 illustrates the errors detected as shown in FIG. 44, however, the errors are now quantified by severity level, e.g., severity 1, 2 or 3, (as determined by the defect classification mapping tool 35). In accordance with aspects of the invention, by quantifying (and presenting in a report) the detected errors identified by severity level, for example, as illustrated in FIG. 45, the present invention may be used to identify opportunities, e.g., to prevent the injection of defects, as discussed further below.

Figure 46:
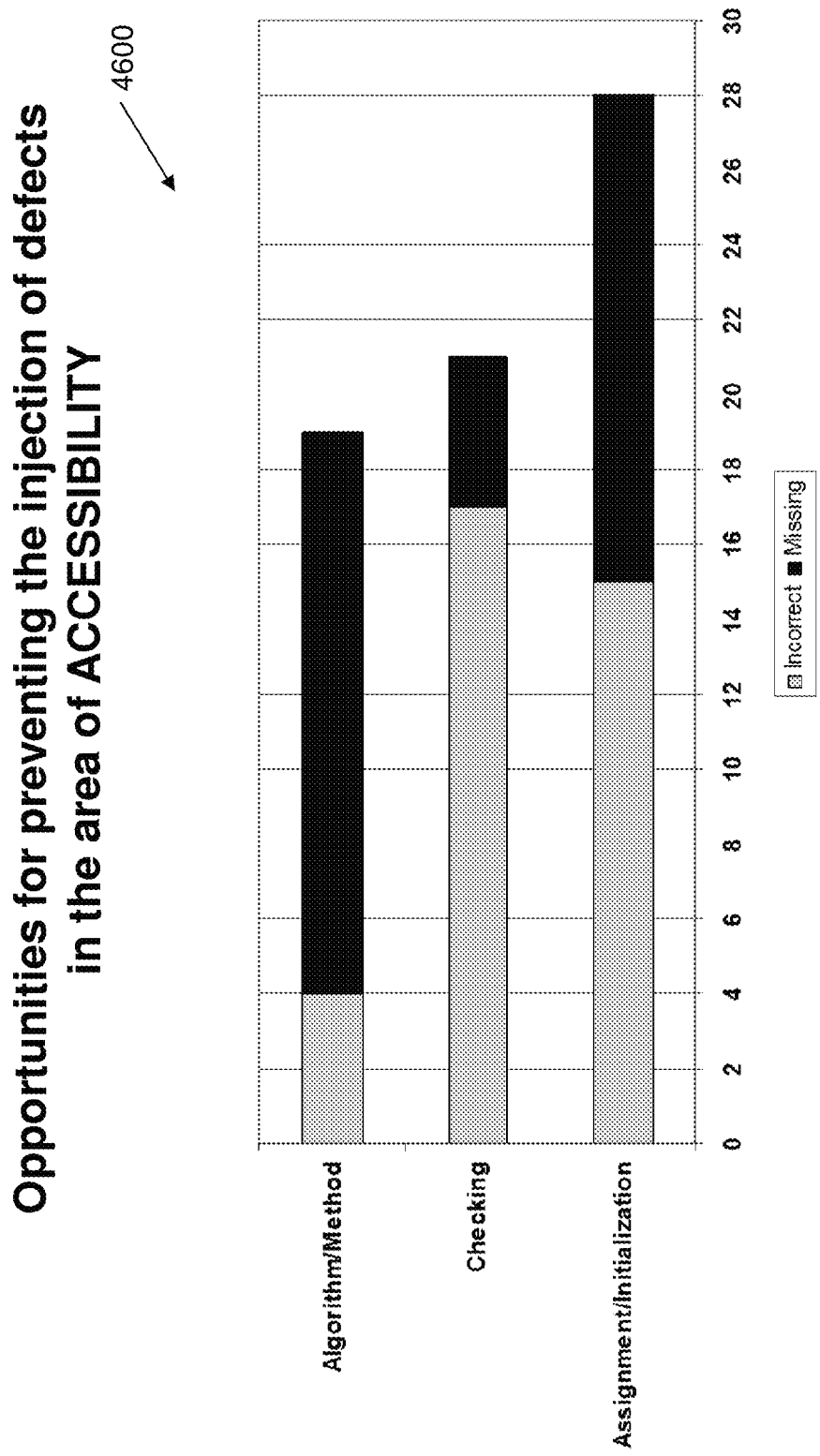

FIG. 46 illustrates an exemplary histogram of defects 4600 by DRM artifact type (e.g., checking, algorithm/method, or assignment/initialization) and qualifier (e.g., incorrect or missing) in accordance with aspects of the invention. More specifically, FIG. 46 illustrates the errors detected as shown in FIG. 44, however, the same errors are now quantified by DRM artifact type and qualifier, (as determined by the defect classification mapping tool 35).

In accordance with aspects of the invention, by quantifying (and presenting in a report) the detected errors identified by DRM artifact type and qualifier, for example, as illustrated in FIG. 46, the present invention may be used to identify opportunities, e.g., to prevent the injection of defects. With an understanding of how past defects (as detected by the code inspection tools) were injected into the software code lifecycle, an organization may discover opportunities for preventing the injection of future defects. For example, as shown in FIG. 46, a majority of the algorithm/method type defects have a "missing" defect qualifier. Conversely, with the example of FIG. 46, a majority of the checking type defects have an "incorrect" defect qualifier. In accordance with aspects of the invention, this information may be used to discover opportunities for preventing the injection of future defects, e.g., adjusting staffing levels and/or review processes.

Figure 47:
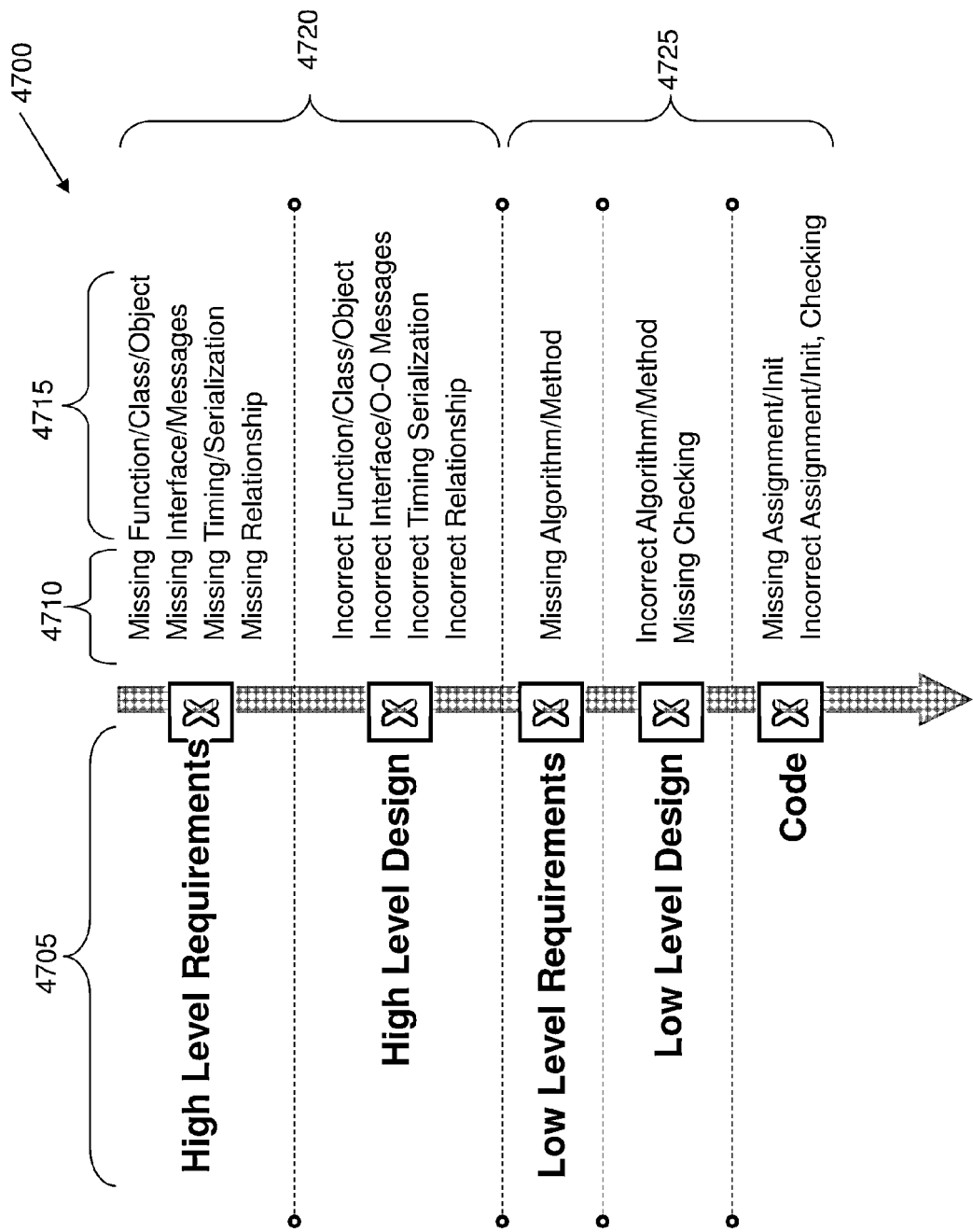
FIG. 47 illustrates an exemplary illustration of defect artifact types mapped to a process point when those defects are injected in accordance with aspects of the present invention.

FIG. 47 illustrates an exemplary illustration of table 4700 of defect artifact types mapped to a process point when those defects are injected. In embodiments, table 4700 may be used to identify defect prevention opportunities. As shown in FIG. 47, table 4700 includes column 4705 listing the generic process areas in the software development life cycle when particular defects may be injected. As illustrated in FIG. 4700, the lowest process area, "code," is later in the life cycle and the highest process area, "high level requirements," is earlier in the life cycle. Table 4700 additionally includes qualifier column 4710 indicating a defect qualifier (e.g., missing or incorrect) and a type column 4715 indicating a defect type (e.g., relationship, checking, etc.).

Table 4700 indicates earlier process areas 4720 and later process areas 4725. Earlier process areas 4720 include defects that are only found by a user evaluating function in relatively sophisticated ways. As such, an automated code inspection tool would not discover these types of defects. In contrast, later process areas 4725 include defects uncovered using an automated code inspection tool. In accordance with aspects of the invention, in embodiments, the report generation tool is operable to map defects by artifact type, qualifier and/or process area.

With an understanding of how past defects (as detected by the code inspection tools) were injected into the software code lifecycle, an organization may discover opportunities for preventing the injection of further defects. For example, "missing algorithms" and "missing checking" may each indicate weaknesses existed in the low level (or detailed) requirements development and/or process. Additionally, for example "incorrect assignments" and "incorrect checking" indicate coding oversights. "Missing assignments" indicates coding oversights as well. Static testing methods, such as code inspection services, unit testing and/or code inspections, could be used to remove such coding oversights earlier in the life cycle (thus, reducing costs).

Figure 48:
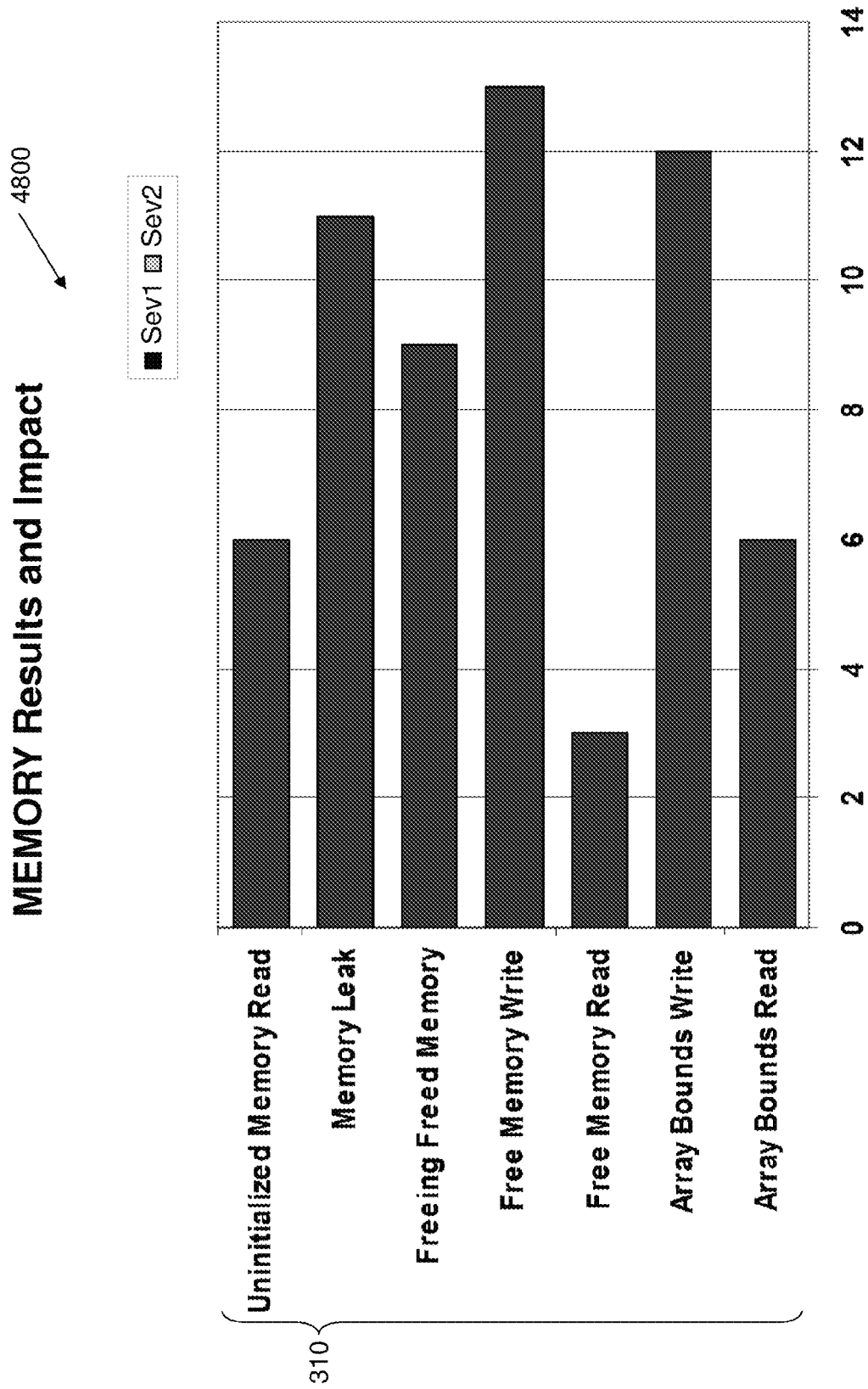
FIGS. 48-58 illustrate additional exemplary histograms in accordance with aspects of the present invention.

FIG. 48 illustrates an exemplary histogram 4800 of memory defects found using a particular code inspection service (e.g., Purify Plus) by severity level. As shown in FIG. 48, histogram 4800 quantifies occurrences of each of the possible tool error outputs 310 for the Purify Plus code inspection tool. Moreover, histogram 4800 indicates the number of defects by severity level. As can be observed, with exemplary histogram 4800 all of the errors are "Severity 1."

Figure 49:
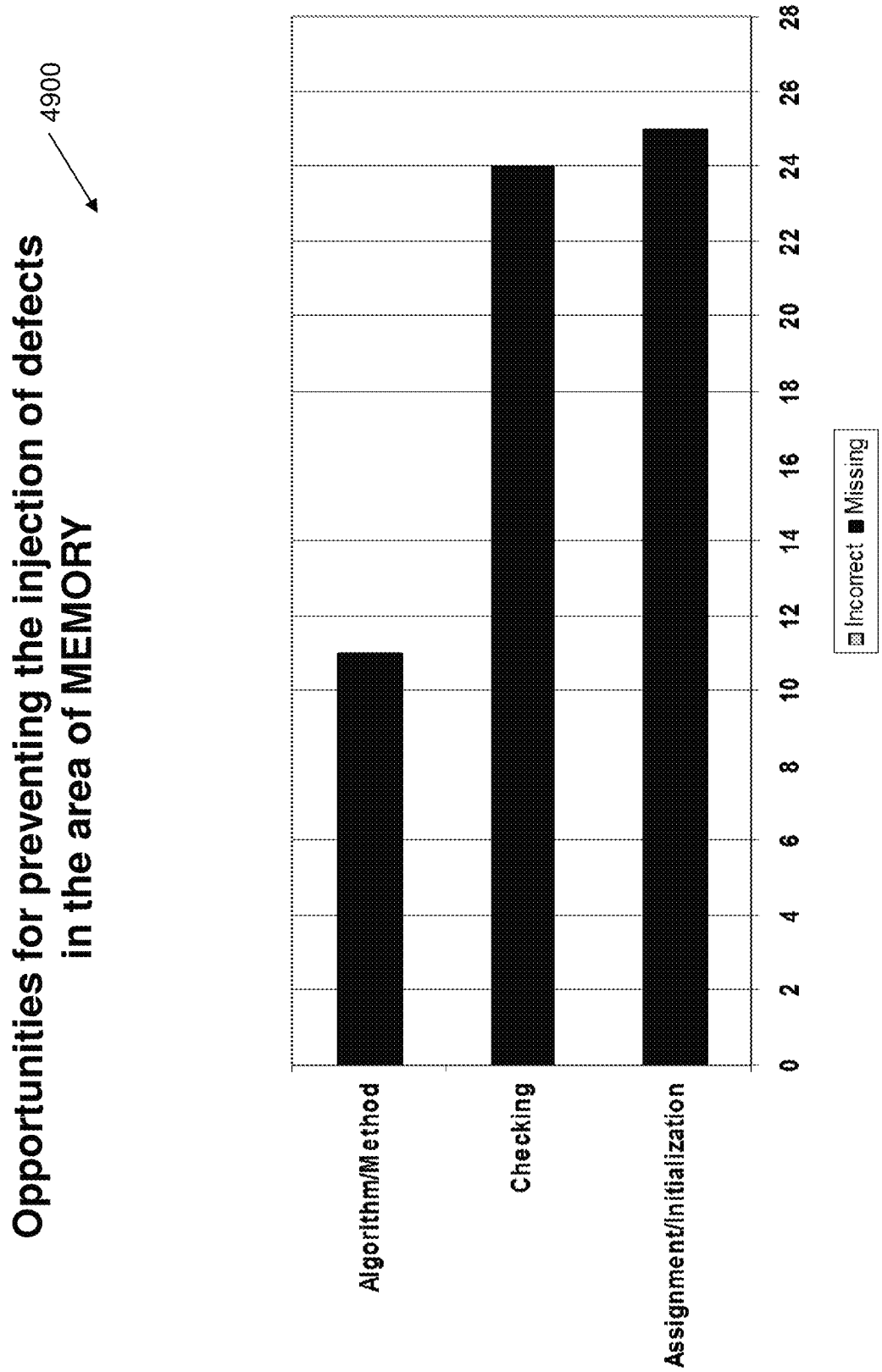

FIG. 49 illustrates an exemplary histogram of memory defects 4900 by DRM artifact type (e.g., checking, algorithm/method, or assignment/initialization) and qualifier (e.g., incorrect or missing) in accordance with aspects of the invention. FIG. 49 is similar to FIG. 46, described above. As such, further description of FIG. 49 is not necessary for those of skill in the art to practice the present invention, but for further elucidation, pertinent portions of the figures are discussed herein. In accordance with aspects of the invention, by quantifying (and presenting in a report) the detected errors identified by DRM artifact type and qualifier, for example, as illustrated in FIG. 49, the present invention may be used to identify opportunities, e.g., to prevent the injection of defects. With an understanding of how past defects (as detected by the code inspection tools) were injected into the software code lifecycle, an organization may discover opportunities for preventing the injection of future defects. For example, as shown in FIG. 49, all of the defects have a "missing" defect qualifier. In accordance with aspects of the invention, this information may be used to discover opportunities for preventing the injection of future defects, e.g., adjusting staffing levels and/or review processes.

Figure 50:
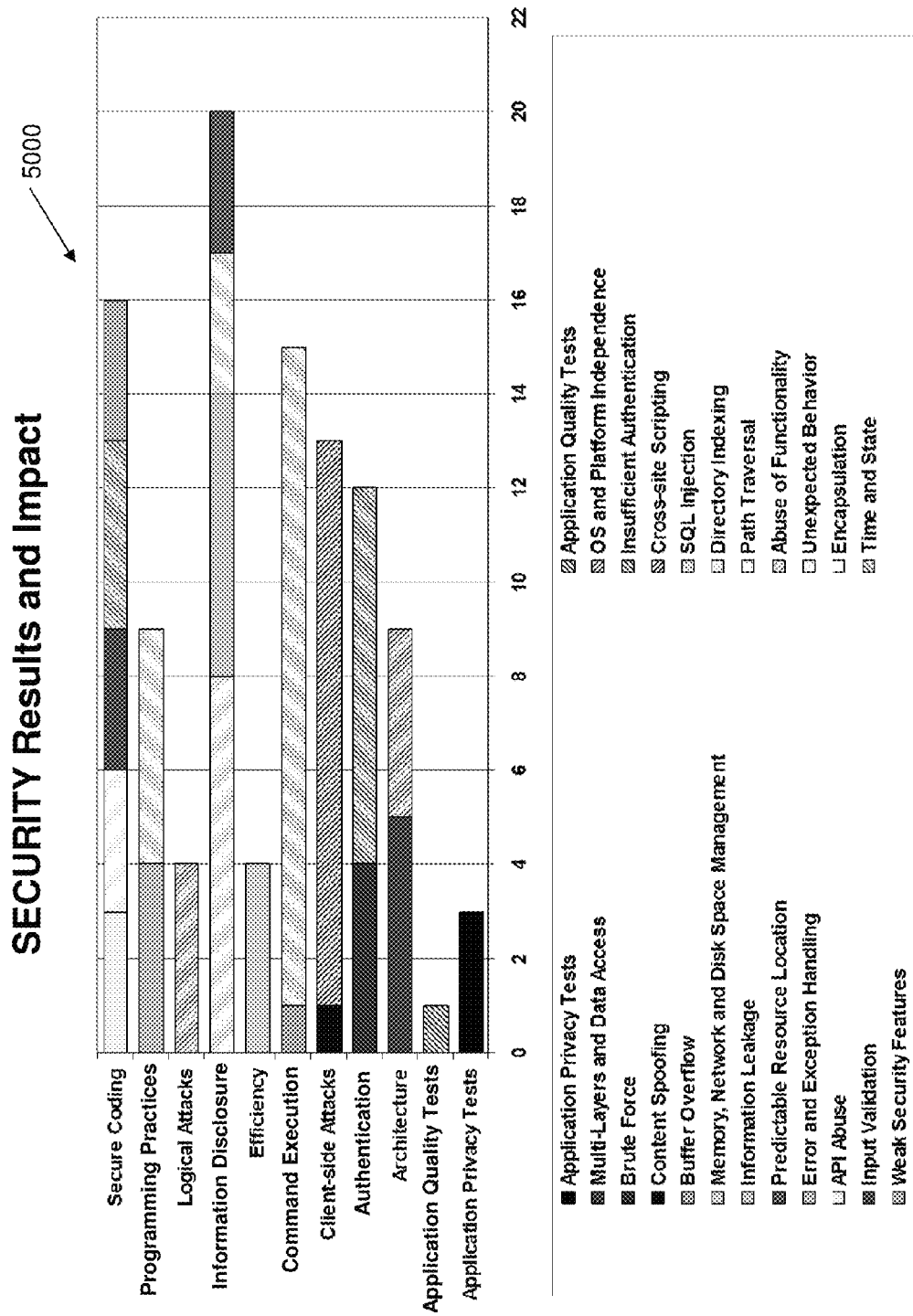

FIG. 50 illustrates an exemplary histogram 5000 of defects found by tool error category, and implications. In accordance with aspects of the invention, the report generation tool 40 may generate a histogram, e.g., exemplary histogram 5000 of defects found by tool error category, and implications, as a report or as a component of a report. Additionally, in embodiments, the histogram 5000 may indicate defect subcategories, if they are defined (for example, as listed in the table key 5010 and identified by, e.g., different pattern and/or shades). More specifically, FIG. 50 illustrates a quantification of security defects found using a particular code inspection service. As shown in FIG. 50, the most frequent security defects (e.g., as determined by a code inspection service) are "Information Disclosure" security defects. Additionally, for each defect type, exemplary histogram 5000 indicates security defect subcategories.

Figure 51:
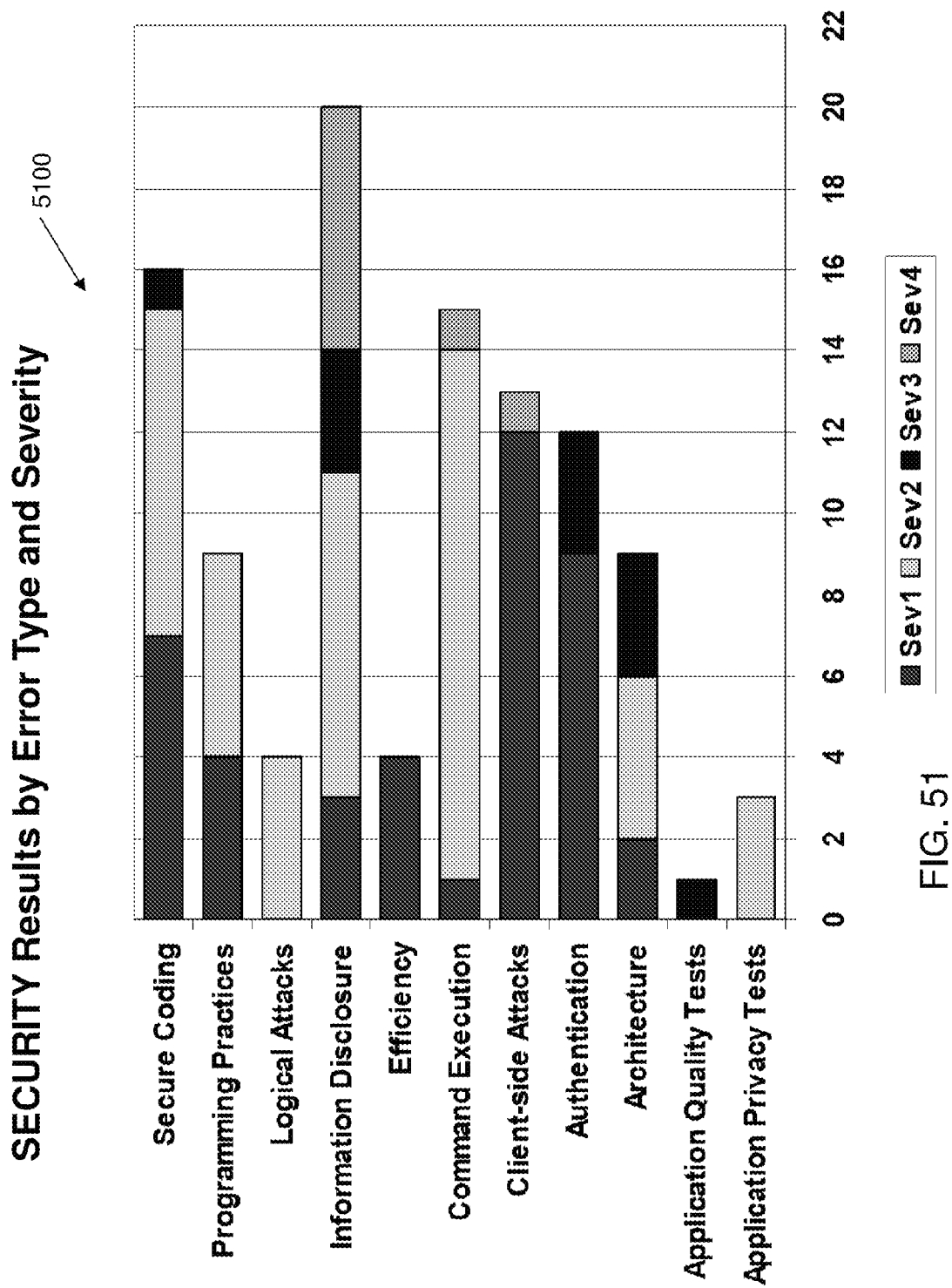

FIG. 51 illustrates an exemplary histogram of security defects by severity 5100. More specifically, FIG. 51 illustrates the errors detected as shown in FIG. 50, however, the errors are now quantified by severity level, e.g., severity 1, 2, 3 or 4 (as determined by the defect classification mapping tool 35). In accordance with aspects of the invention, by quantifying (and presenting in a report) the detected errors identified by severity level, for example, as illustrated in FIG. 51, the present invention may be used to identify opportunities, e.g., to prevent the injection of defects.

Figure 52:
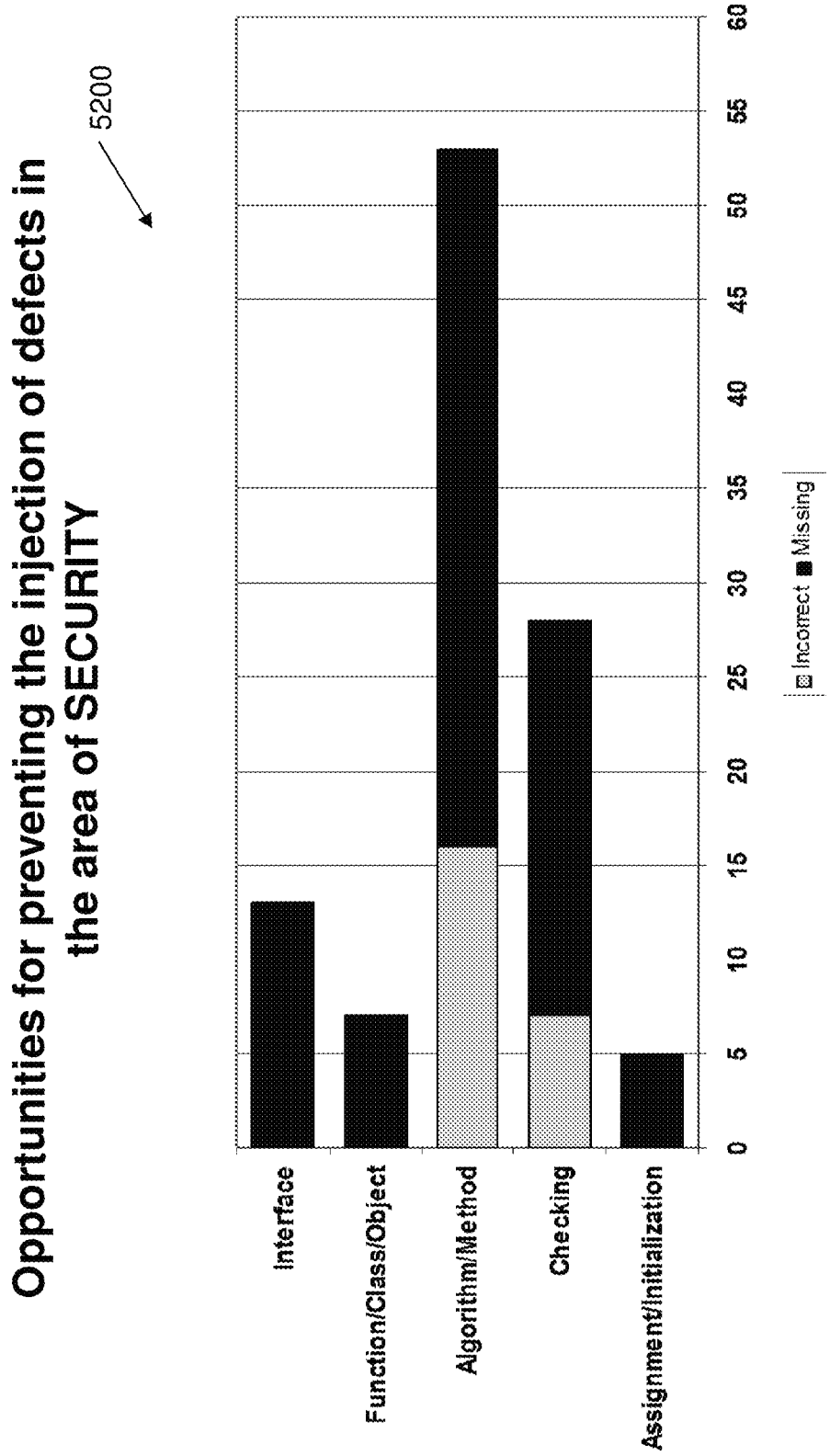
Figure 53:
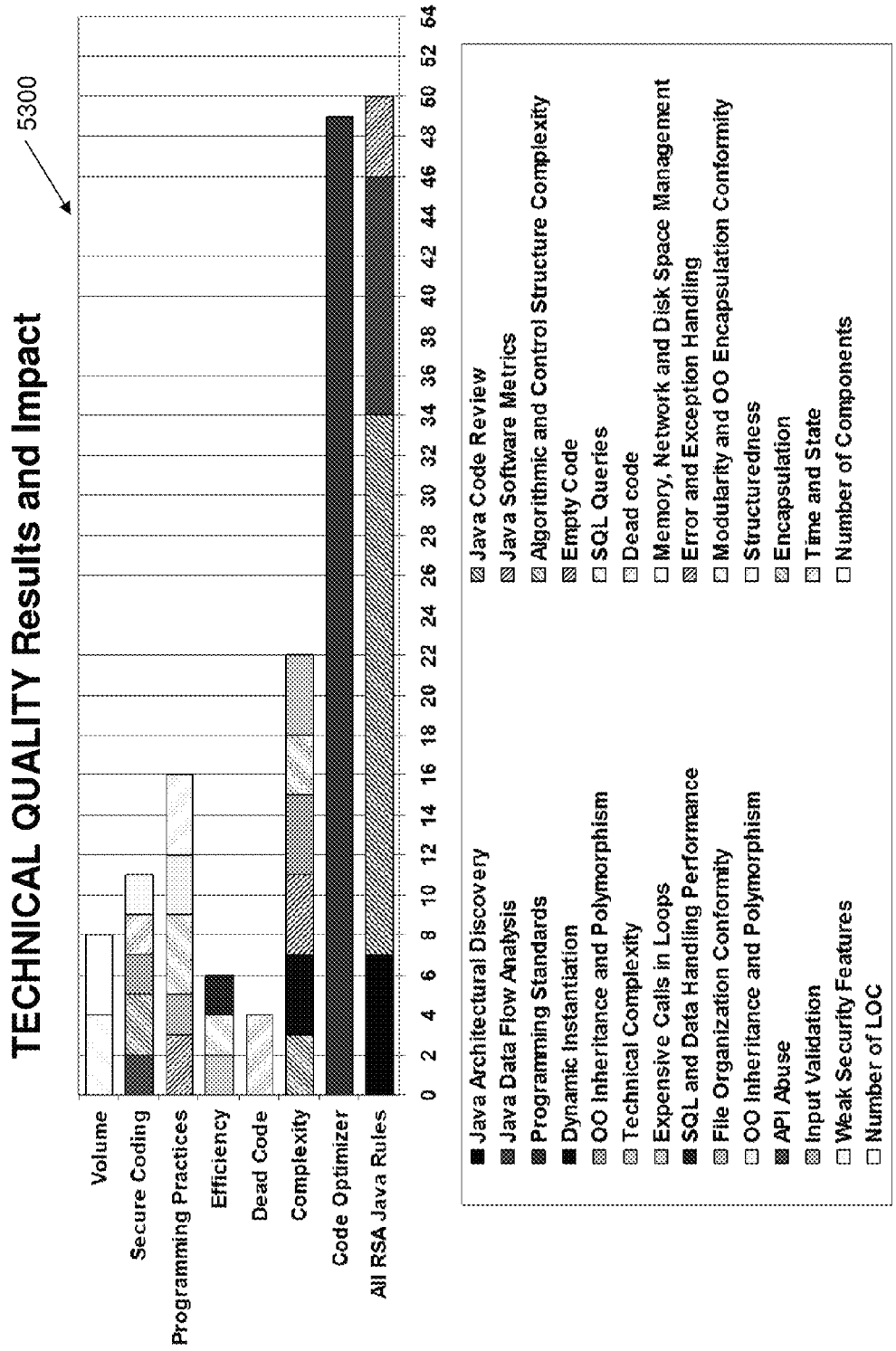
Figure 54:
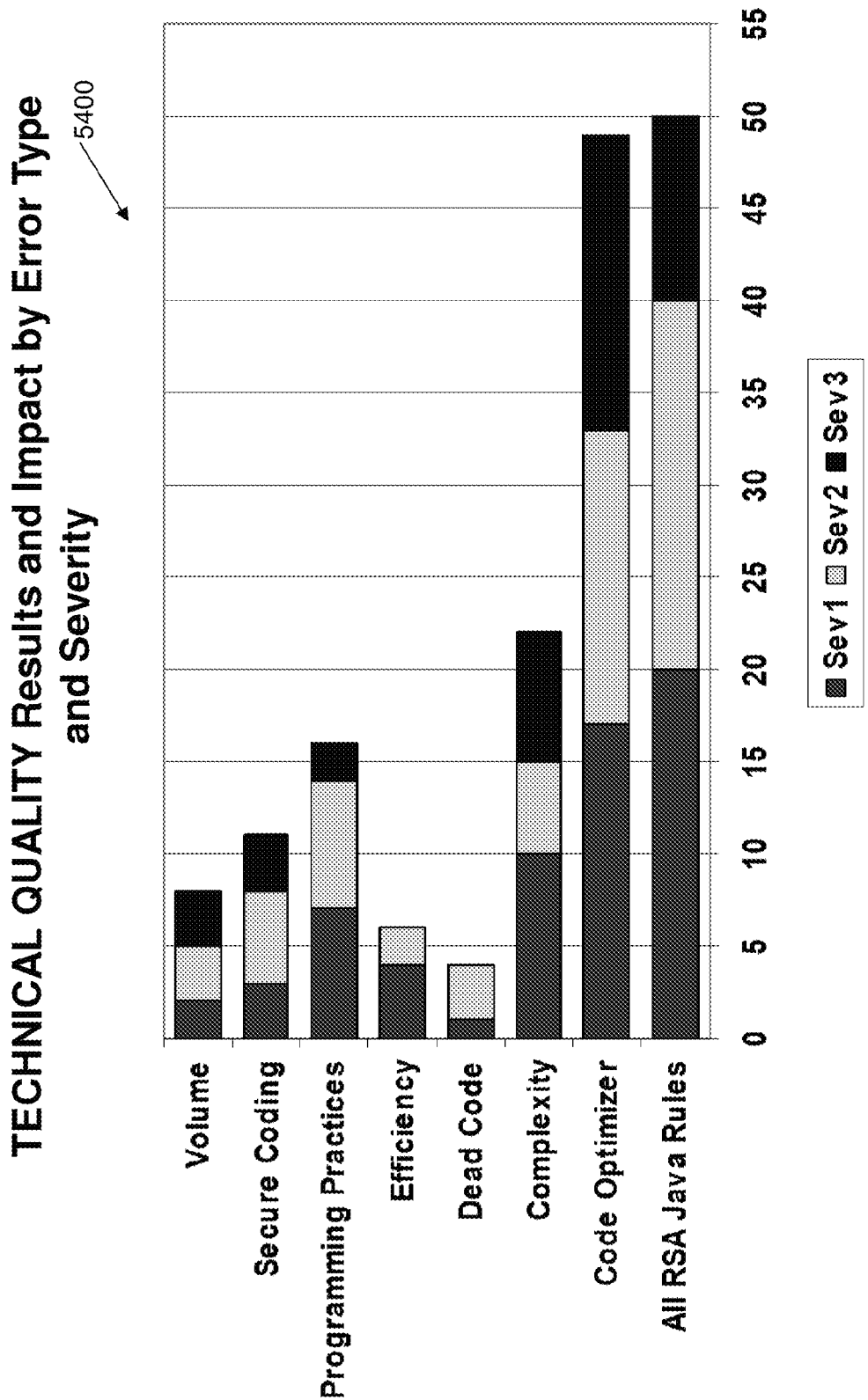
Figure 55:
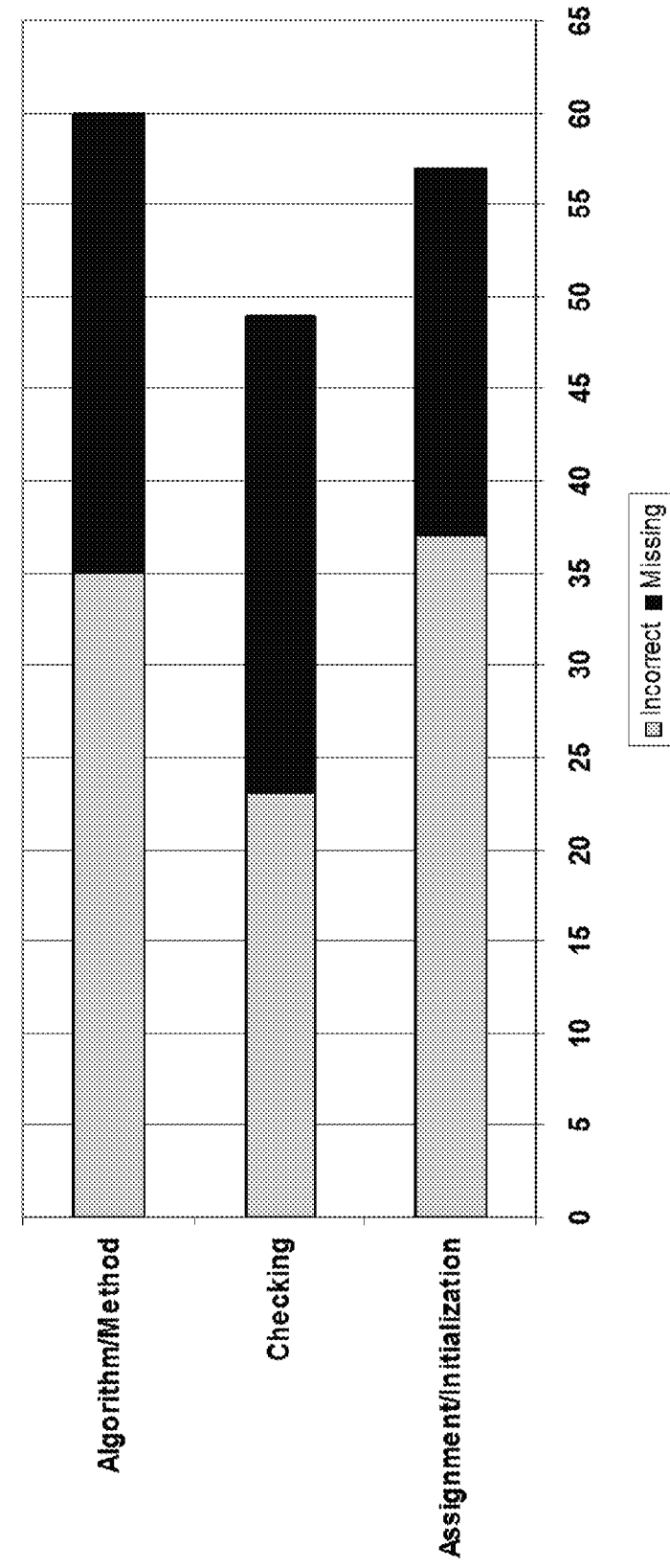

FIG. 52 illustrates an exemplary histogram of security defects by DRM artifact type (e.g., checking, algorithm/method, or assignment/initialization, etc.) and qualifier (e.g., incorrect or missing) in accordance with aspects of the invention. FIG. 52 is similar to FIGS. 46 and 49, described above. As such, further description of FIG. 52 is not necessary for those of skill in the art to practice the present invention, but for further elucidation, pertinent portions of the figures are discussed herein. In accordance with aspects of the invention, by quantifying (and presenting in a report) the detected security errors identified by DRM artifact type and qualifier, for example, as illustrated in FIG. 52, the present invention may be used to identify opportunities, e.g., to prevent the injection of defects. For example, as shown in FIG. 52, most of the security defects have a "missing" defect qualifier. In accordance with aspects of the invention, this information may be used to discover opportunities for preventing the injection of future security defects, e.g., adjusting staffing levels and/or review processes.

FIGS. 53-55 illustrate exemplary histogram 5300 of technical quality defects found by tool error category, and implications, exemplary histogram 5400 of technical quality defects by severity and exemplary histogram of technical quality defects by DRM artifact type (e.g., checking, algorithm/method, or assignment/initialization, etc.) and qualifier (e.g., incorrect or missing) in accordance with aspects of the invention As FIGS. 53-55 are similar to FIGS. 50-52, described above, a further description of FIGS. 53-55 is not necessary for those of skill in the art to practice the invention.

Figure 56:
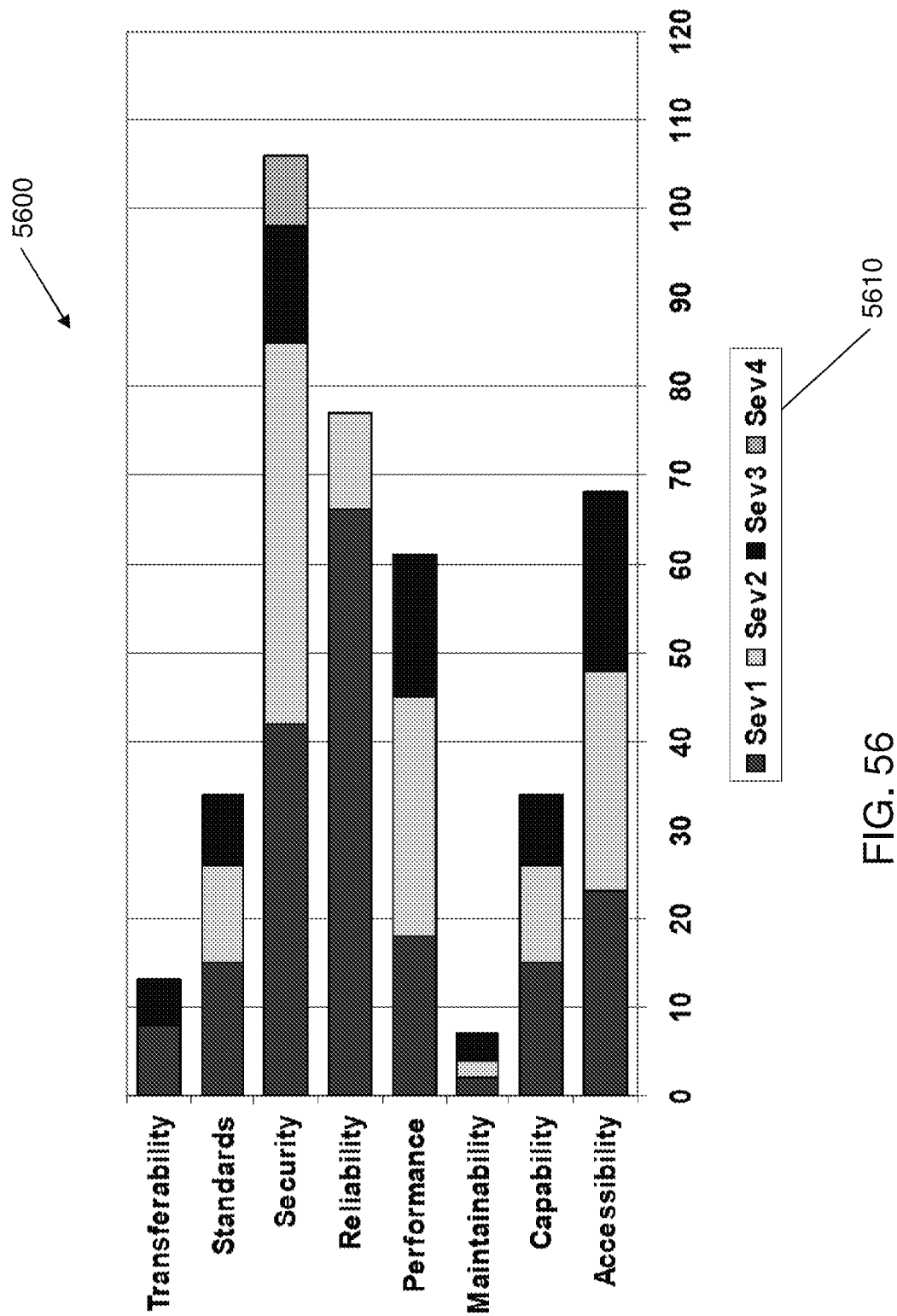

FIG. 56 illustrates an exemplary summary metrics histogram 5600 indicating a quantification of defect types. Additionally, histogram 5600 indicates, for each defect type, (e.g., transferability, security, etc.), the number of errors for each severity level (e.g., "Severity 1," "Severity 2," etc.), as indicated by key 5610.

Figure 57:
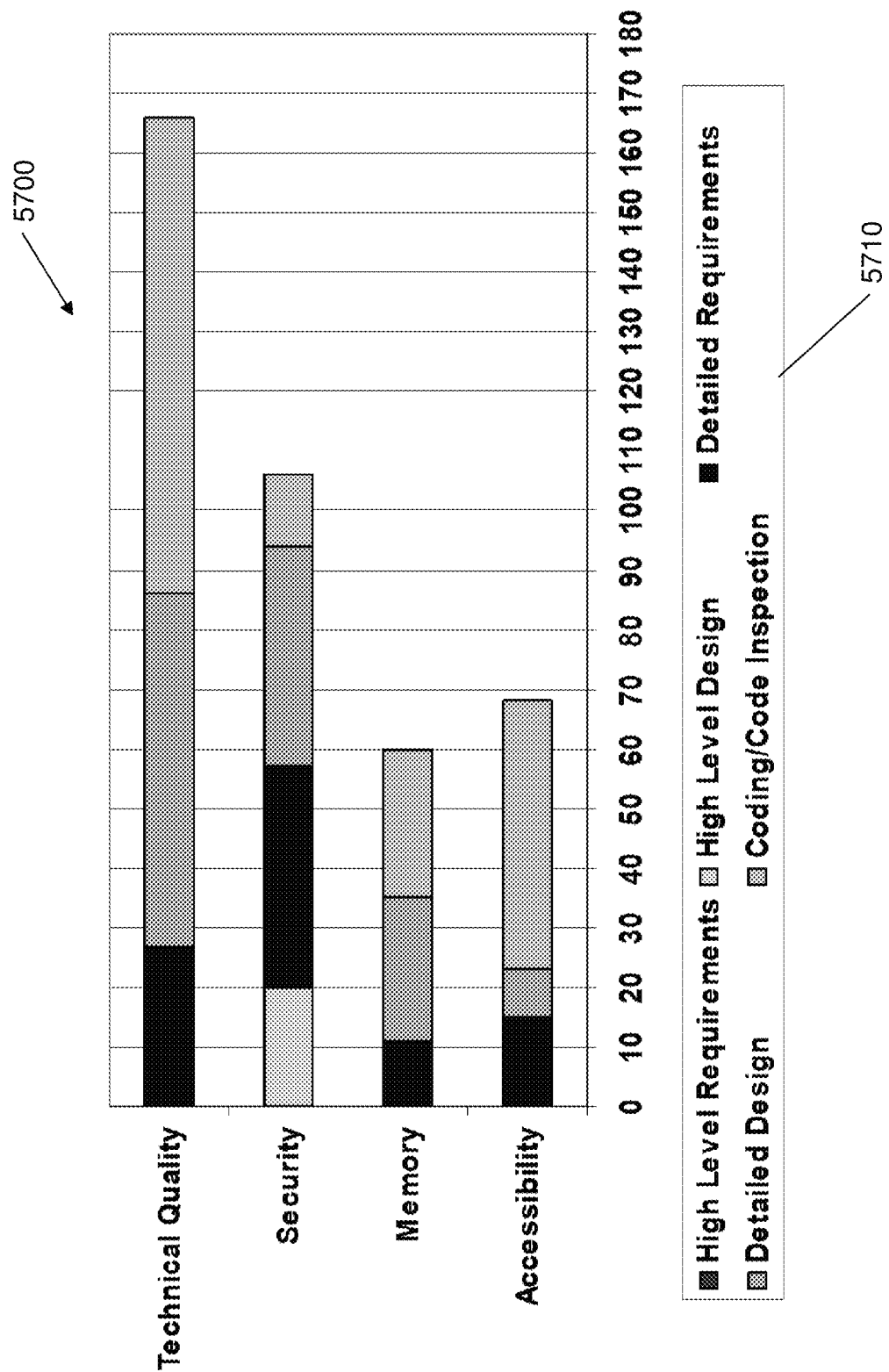
Figure 58:
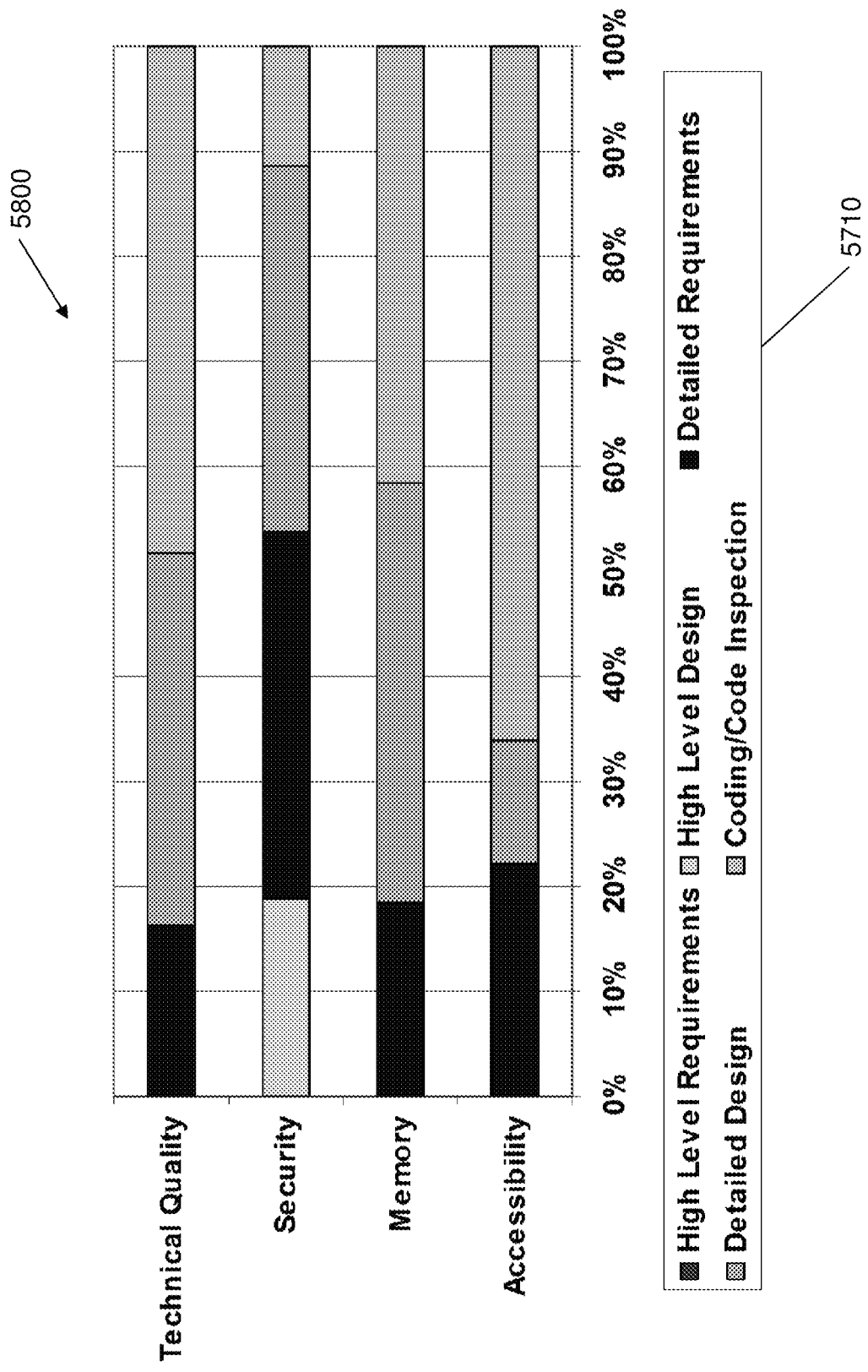

FIG. 57 illustrates an exemplary summary metrics histogram 5700 indicating a quantification of defects in the four analysis areas (e.g., technical quality, security, accessibility and memory) for the different stages of the software development life cycle (e.g., high level requirements, detailed design, etc.), as indicated by key 5710. FIG. 58 illustrates an exemplary summary metrics histogram 5800 indicating a quantification of defects as a percentage of total defects in the four analysis areas (e.g., technical quality, security, accessibility and memory) for the different stages of the software development life cycle (e.g., high level requirements, detailed design, etc.), as indicated by key 5710.

FIG. 59 illustrates a trigger summary 5900 in accordance with aspects of the invention. As shown in FIG. 59, the trigger summary 5900 includes an analysis area column 5905 indicating the analysis area (e.g., accessibility, memory, technical quality, and security). Additionally, the trigger summary 5900 includes a trigger column 5910 listing the detected defect triggers (e.g., as determined from the code inspection service) and a severity level column 5915 listing the severities for each of the defect triggers (e.g., as determined by the defect classification mapping tool 35). The trigger summary 5900 also includes a frequency column 5920 which indicates a quantification of detected code defects by trigger and severity.

Flow Diagram

Figure 60:
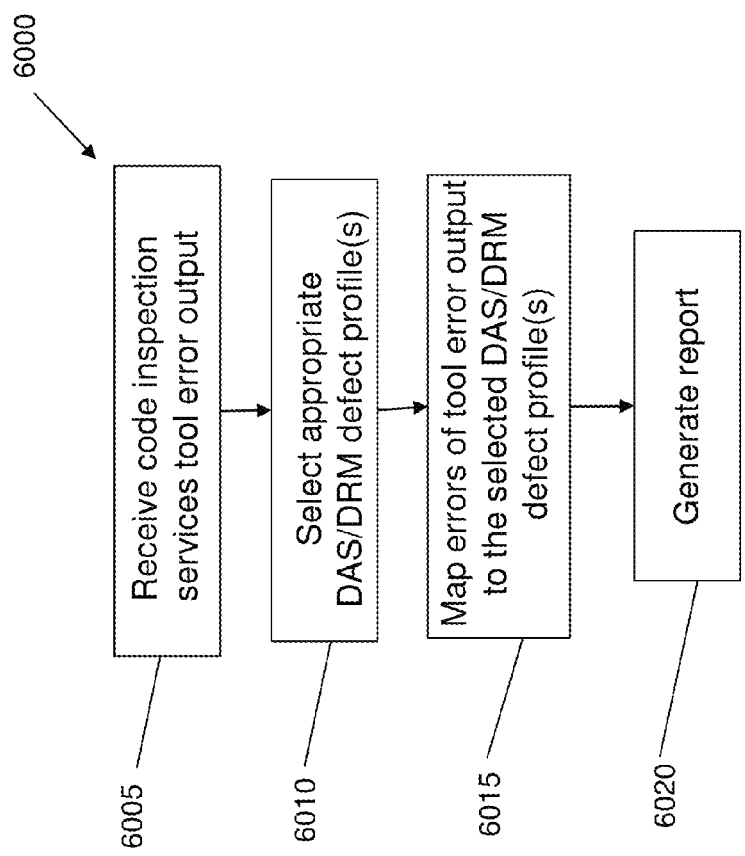
FIG. 60 shows an exemplary flow for performing aspects of the present invention.

FIG. 60 shows an exemplary flow for performing aspects of the present invention. The steps of FIG. 60 may be implemented in the environment of FIG. 1, for example. The flow diagram may equally represent a high-level block diagram or a swim-lane diagram of the invention. The flowchart and/or block diagram in FIG. 60 illustrates the architecture, functionality, and operation of possible implementations of systems, methods and computer program products according to various embodiments of the present invention. In this regard, each block in the flowchart, block diagram or swim-lane diagram may represent a module, segment, or portion of code, which comprises one or more executable instructions for implementing the specified logical function(s). It should also be noted that, in some alternative implementations, the functions noted in the blocks may occur out of the order noted in the figure. For example, two blocks shown in succession may, in fact, be executed substantially concurrently, or the blocks may sometimes be executed in the reverse order, depending upon the functionality involved. Each block of each flowchart, and combinations of the flowchart illustration can be implemented by special purpose hardware-based systems that perform the specified functions or acts, or combinations of special purpose hardware and computer instructions and/or software, as described above. Moreover, the steps of the flow diagram may be implemented and executed from either a server, in a client server relationship, or they may run on a user workstation with operative information conveyed to the user workstation. In an embodiment, the software elements include firmware, resident software, microcode, etc.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

As shown in FIG. 6000, at step 6005, an error output receiving tool receives the code inspection service tool error output determined from testing, e.g., an organization's code. At step 6010, the selection tool selects one or more appropriate defect classification mapping profiles based on which code inspection service(s) was (or were) utilized to test code. For example, if a WebKing automated code inspection service has been utilized, the present invention accesses the WebKing defect classification mapping profile(s).

At step 6015, the defect classification mapping tool maps errors of the tool error output to the selected one or more defect classification mapping profiles. For example, the defect classification mapping tool may quantify the occurrences of each possible tool error outputs for each of the selected code inspection services and map each of the error outputs to its respective classifications (e.g., target, trigger, impact, type, qualifier and severity level, amongst other classifications) using the appropriate defect classification mapping profile defect. At step 6020, the report generation tool generates one or more reports based on the mapping of the tool error output to the selected one or more defect classification mapping profiles, for example, a report containing, e.g., defect analysis metrics.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method implemented in a computer infrastructure having computer executable code tangibly embodied on a computer readable storage memory having programming instructions configured to:
   receive a tool error output determined by one of a plurality of code inspection tools offered, respectively, by one of a plurality of code inspection services;
   compare the tool error output to a listing of possible error outputs for a plurality of code inspection tools;
   determine an identification of the one of the code inspection tools, from among the plurality of code inspection tools, that generated the tool error output based on the comparison;
   select at least one defect classification mapping profile based on the identified one of the code inspection tools;
   quantify occurrences of each of the possible tool error outputs for each of the plurality of code inspection tools;
   map the tool error output to one or more output classifications using the selected at least one defect classification mapping profile; and
   quantify a number of defects of the possible tool error outputs based on the one or more of the output classifications,
   wherein the selecting the at least one defect classification mapping profile comprises selecting one or more designated defect classification mapping profiles, which each comprise:
   the listing of possible tool error outputs for a particular code inspection tool; and
   for each of the possible tool error outputs, a corresponding output classification with a common classification schema.

2. The method of claim 1, wherein the one or more output classifications comprise at least one of: a target, a trigger, an impact, a type, a qualifier and a severity.

3. The method of claim 2, wherein:
   the target indicates a level cause of a defect;
   the trigger indicates at least one of how the defect was discovered and circumstances surrounding a defect discovery;
   the impact indicates an impact to a user;
   the type indicates a size and complexity of a fix for the defect;
   the qualifier indicates whether the defect is related to incorrect, extraneous or missing code; and
   the severity indicates a relative severity of the defect.

4. The method of claim 3, wherein the comparing of the tool error output is based on organization codes of individual ones of the plurality of code inspection services.

5. The method of claim 4, wherein the tool error output comprises one or more error texts.

6. The method of claim 5, wherein the code inspection tools comprise automated code inspection tools.

7. The method of claim 6, wherein the computer readable storage memory has programming instructions further configured to generate at least one report based on the one or more output classifications.

8. The method of claim 1, wherein:
   the tool error output comprises one or more error texts; and
   the mapping the tool error output to the one or more output classifications using the selected at least one defect classification mapping profile comprises for each of the one or more error texts, determining a corresponding output classification.

9. The method of claim 8, wherein the corresponding output classification comprises at least one of a corresponding target, a corresponding trigger, a corresponding impact, a corresponding type, a corresponding qualifier and a corresponding severity in accordance with a common classification schema.

10. The method of claim 1, wherein the tool error output identifies at least one code defect which is at least one of an accessibility defect, a memory defect, a security defect and a technical quality defect.

11. The method of claim 1, wherein the comparing of the tool error output is based on organization codes of individual ones of the plurality of code inspection services.

12. The method of claim 11, wherein the tool error output comprises one or more error texts.

13. The method of claim 12, wherein the code inspection tools comprise automated code inspection tools.

14. The method of claim 13, wherein the computer readable storage memory has programming instructions further configured to generate at least one report based on the one or more output classifications.

15. The method of claim 1, wherein the comparing of the tool error output is based on organization codes of individual ones of the plurality of code inspection services.

16. The method of claim 15, wherein the tool error output comprises one or more error texts.

17. The method of claim 16, wherein the code inspection tools comprise automated code inspection tools.

18. The method of claim 17, wherein the computer readable storage memory has programming instructions further configured to generate at least one report based on the one or more output classifications.

* * * * *